United States Patent [19]
Ueda

[11] Patent Number: 5,631,855
[45] Date of Patent: May 20, 1997

[54] METHODS AND APPARATUS FOR ANALYZING PHYSICAL QUANTITIES AND APPARATUS FOR REDUCING LINE SPECTRUM NOISE

[75] Inventor: Tomoaki Ueda, Kyola, Japan

[73] Assignee: Daikin Industries, Ltd., Osaka, Japan

[21] Appl. No.: 190,116

[22] PCT Filed: Aug. 4, 1992

[86] PCT No.: PCT/JP92/00991

§ 371 Date: Feb. 3, 1994

§ 102(e) Date: Feb. 3, 1994

[87] PCT Pub. No.: WO93/03328

PCT Pub. Date: Feb. 18, 1993

[30] Foreign Application Priority Data

| Aug. 5, 1991 | [JP] | Japan | 1-95581 |
| Nov. 25, 1991 | [JP] | Japan | 3-36012 |

[51] Int. Cl.$^6$ ............................................. G06F 15/00
[52] U.S. Cl. ................... 364/574; 364/571.01; 364/569
[58] Field of Search ....................... 364/574, 571.01, 364/569

[56] References Cited

U.S. PATENT DOCUMENTS 4,034,207  7/1977  Tamada et al. .

FOREIGN PATENT DOCUMENTS

| 57-44122 | 9/1982 | Japan . |
| 59-68620 | 4/1984 | Japan . |
| 62-73174 | 4/1987 | Japan . |
| 2-259464 | 10/1990 | Japan . |
| 4-64076 | 2/1992 | Japan . |

OTHER PUBLICATIONS

Kobayashi, Fujio et al., IEE Journal thesis, No. 92—vol.A, 9th edit., (Tokyo), "Successive Approxmation of Hypercomples Simultaneous equations using Measurements" pp. 431–439 1972.

Murata, Kenro et al., Super Computer Application to Scientific technological calculations, Maruzen pp. 136–153 Mar. 15, 1985.

Kobayashi, Fujio, Solutions of Simultnaous linear equations in bad conditions with restrictions, Information Processing, vol. 16, 9th edit. pp. 789–794 1975.

*Primary Examiner*—Emanuel T. Voeltz
*Assistant Examiner*—Kamini Shah
*Attorney, Agent, or Firm*—Beveridge, DeGrandi, Weilacher & Young, L.L.P.

[57] ABSTRACT

Operations of physical formula which is determined its main portion based upon physical quantities, are performed by plural physical formula operating units (11)(12) . . . (1m) based upon known information, operation results are cumulatively added by a sigma unit (2) and a difference between the cumulatively added result and an actually measured value is calculated by an error operating section (3), and variables included in the physical formula are corrected by correcting sections (11a)(12a) . . . (1ma) of the physical formula operating units (11)(12) . . . (1m) so as to decrease the difference. After the series of processings is repeated by a required number of times, the corrected variables are collected and output as analysis results of physical quantities by an information collecting unit (4). As a result, simplification in arrangement can be performed, and analysis of physical quantities of physical sources can be performed with small number of studying times.

4 Claims, 21 Drawing Sheets

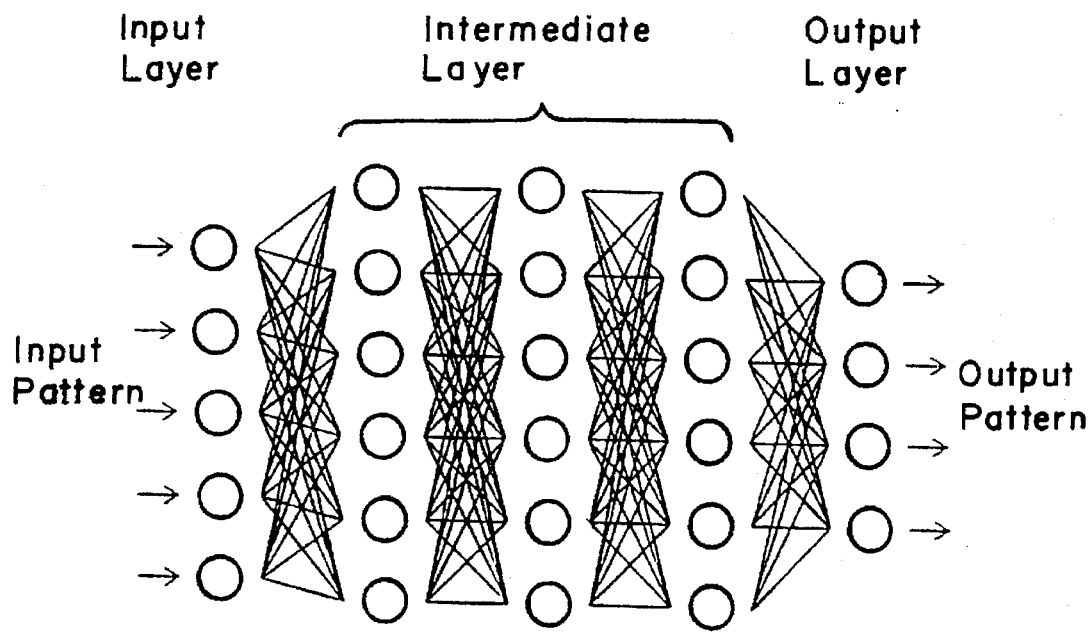
FIG. 23
FIG. 24
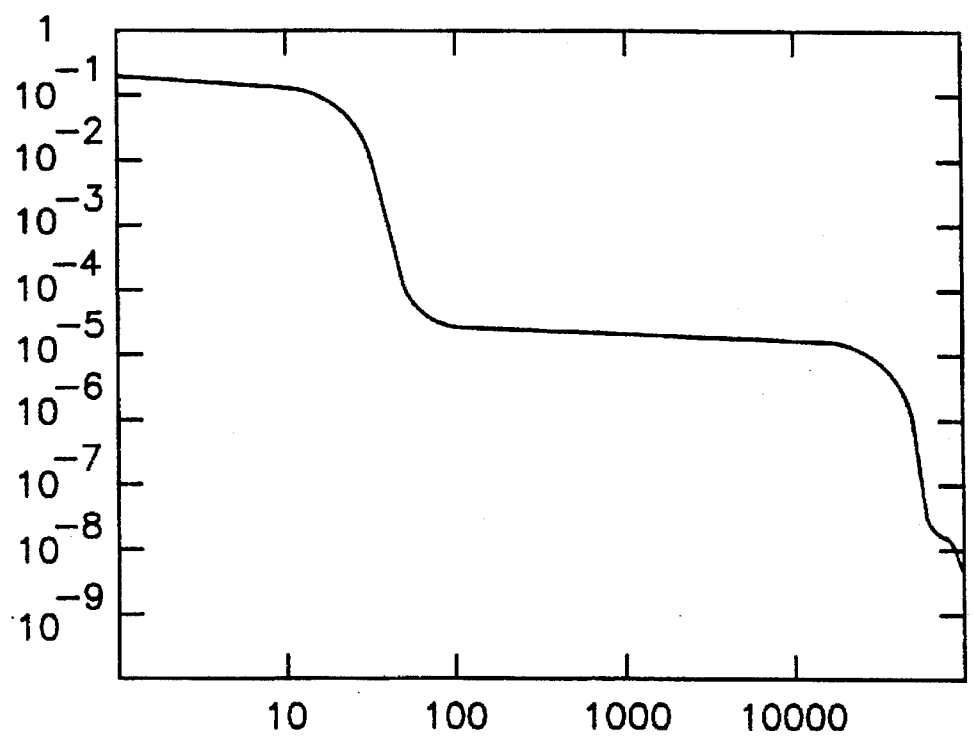

METHODS AND APPARATUS FOR ANALYZING PHYSICAL QUANTITIES AND APPARATUS FOR REDUCING LINE SPECTRUM NOISE

TECHNICAL FIELD

This invention relates to methods and apparatus for analyzing physical quantities and to an apparatus for reducing line spectrum noise. More particularly, the present invention relates to methods and apparatus for calculating physical quantities of physical sources based upon measured values of physical quantities which are obtained at plural points apart from the physical sources and observation conditions at measuring timing, and relates to apparatus for reducing line spectrum noises from a measured signal which includes line spectrum noises.

BACKGROUND ART

In the past, an apparatus has been proposed which analyzes biological magnetic field sources (one species of physical sources) by disposing plural Superconducting QUantum Interference Device (hereinafter referred to as SQUID) magnetometers in a closed condition relative to the living organism, the SQUID magnetometer employing SQUIDs.

The apparatus performs the following processes using a supercomputer. That is, a) Scattering m-numbered current elements using random numbers within a search space which is searched by the plural SQUID magnetometers. Input parameters of a current source i are position information P(x,y,z) and a current vector I(X,Y,Z), thereby 6 m-numbered parameters xi,yi,zi,Xi,Yi,Zi (i=1,2, ... m) are determined using random numbers.

b) Calculating a total estimated error E by an estimated error calculating process which is described later.

c) Repeating the following processing d) to g).

d) Selecting a current element arbitrarily, and evaluating parameters of corresponding current element k and the total estimated error. That is, processings of position information Ps (xs, ys, zs)=Pk (xk, yk, zk), a current vector Is (Xs, Ys, Zs)=Ik (Xk, Yk, Zk), and a total estimated error Es=E are carried out, wherein a suffix k indicates data of a current element k, and a suffix s indicates evaluated data.

e) Varying parameters of the current element k by extremely small quantities using random numbers. That is, when extremely small quantities are supposed as $\Delta x$, $\Delta y$, $\Delta z$, $\Delta X$, $\Delta Y$, $\Delta Z$, processing of Pk (xk, yk, zk)=Pk (xk+$\Delta x$, yk+$\Delta y$, zk+$\Delta z$) Ik (Xk, Yk, Zk)=(Xk+$\Delta X$, Yk+$\Delta Y$, Zk+$\Delta Z$) are carried out.

f) Calculating a total estimated error E by the estimated error calculating process which is described later.

g) Comparing the evaluated total estimated error Es and the total estimated error E, and restoring the information which are evaluated at the processing d) when the total estimated error Es is smaller than the total estimated error E. That is, processing of position information pk (xk, yk, zk)=pk (xs, ys, zs), a current vector Ik (Xk, Yk, Zk)=Is (Xs, Ys, Zs), and a total estimated error E=Es are carried out.

The estimated error calculating process is as follows.

I. Magnetic field at each measuring point j (j=1,2, ... N) is calculated based upon parameters of each current element. That is, 1) Carrying out the following processings 2) and 3) for all measuring points j.
2) Carrying out the following processing 3) for all current elements i.
3) Calculating magnetic field Beij(BXeij,BYeij,BZeij) using the Biot-Savart law, the magnetic field Beij being generated at a measuring point j by a current element i.
4) Calculating the magnetic field Bej using the following equation, the magnetic field Bej being generated at the measuring point j by m-numbered current elements.

$$Bej\ (BXej,\ BYej,\ BZej) = \left( \sum_{i=1}^{m} BXeji, \sum_{i=1}^{m} BYeji, \sum_{i=1}^{m} BZeji \right)$$

II. Calculating an estimated error Ej based upon a measured value Bj(BXj,BYj,BZj) at each measuring point j and an estimated value Bej based upon all current elements, and calculating a total estimated error E. That is, 5) Carrying out the following processing 6) for all measuring points j.
6) Calculating the estimated error Ej at each measuring point j using the following equation.

$$Ej=(BXj-BXej)^2+(BYj-Byej)^2+(BZj-BZej)^2$$

7) Calculating the total estimated error E using the following equation.

$$E = \sum_{j=1}^{n} Ej$$

When the magnetic field sources are analyzed using the apparatus mentioned above, correct analysis results seem to be obtained finally because parameters of current elements k are varied by extremely small quantities so as to decrease the total estimated error E.

But, when the initial condition of current elements k are determined as is illustrated in FIG. 22(A), the current elements k are varied to a condition illustrated in FIG. 22(B) when 2,400 times of processing are carried out, and the current elements k are varied to a condition illustrated in FIG. 22(C) when 3,600 times of processing are carried out. Consequently, final solutions cannot be obtained. When FIGS. 22(B) and (C) are compared to one another, condition of the current element k is varied very slightly, therefore a disadvantage arises in that final solution cannot be obtained even when a number of times of processing is increased. Even if 3,600 times of processing are carried out using a supercomputer, it takes about 20 minutes, therefore the apparatus cannot be utilized at all.

The inventor has found causes for the disadvantages. The causes are as follows: When the processing is carried out at once, it is not assured at all to decrease the total estimated error E, and only processing parts of I.1),2),3) and II.5),6) of the estimated error calculating processings can be processed in parallel, while other processing parts cannot be processed in parallel, therefore increasing the speed of the calculation as a whole cannot be achieved even when a parallel processor system is employed.

In recent years, research of an artificial neural network has developed, and it is considered to apply the artificial neural network to the analysis of the magnetic field sources mentioned above.

The artificial neural network is classified into a hierarchical perceptron (refer to FIG. 23) and a Hopfield model (refer to FIG. 26).

A hierarchical perception is constituted by an input layer for receiving an input pattern, one or more intermediate layers and an output layer for outputting an output pattern, and a plurality of neuron devices constituting each layer are interconnected to one another, as is illustrated in FIG. 23. A back propagation rule is employed as a learning rule of the hierarchical perception. But, when a problem arises when the hierarchical perception becomes complicated, and a large-numbered-layer construction is required, or an increase of a number of neuron devices which constitute one intermediate layer is required. Consequently, a number of neuron devices as a whole becomes great, a number of weighting factors which should be determined by learning becomes extremely great, and an operation load for a converging solution becomes extremely great. Specifically, when learning is carried out for about 50 times for one pattern, an error suddenly decreases so as to settle to a first convergence value, as is illustrated in FIG. 24. When learning is continued, an error may suddenly vary over several times. FIG. 25 illustrates varying of an error for each pattern. In FIG. 25, the combination of the allocation of errors continues (refer to solid lines in FIG. 25) even at a point when the error as a whole (refer to dashed line in FIG. 25) scarcely exists, therefore the trial for decreasing an error as a whole continues. Consequently, when objective accuracy cannot be obtained by a first convergence value, great amount of processing is required to reach the next convergence, and this does not assure a sufficient accuracy will be obtained by the next convergence value.

As is apparent from the foregoing, it is almost impossible to employ a hierarchical perception for analyzing magnetic field sources for practical use because of limitations concerning to learning process of physical phenomena.

A Hopfield model has an arrangement in which each neuron model is interconnected to all other neuron models, and has no classification such as input layer, intermediate layer and output layer of a hierarchical perception, as is illustrated in FIG. 26. And all neuron models can perform functions as an input layer, intermediate layer, and output layer. When a neuron model is supposably a threshold device model, the varying condition of a neuron model i can be modeled by one of following formulae.

$$\left. \begin{array}{l} \text{When } \sum_j Wij - hi > O, Ui \rightarrow 1 \\ \\ \text{When } \sum_j Wij - hi < O, Ui \rightarrow 0 \\ \\ \text{When } \sum_j Wij - hi = O, Ui \text{ is unchanged.} \end{array} \right\} \quad (1)$$

Ui represents an activity or output value of the neuron model i, hi represents a threshold value of the neuron model i, Wij represents a weighting factor, and i is not equal to j. The function $$En(U1, U2, \ldots Un, h1, h2, \ldots hn) = \sum_i \sum_j WijUiUj + \sum_i \alpha i hi Ui \quad (2)$$

($\alpha i$ is a positive constant, and i is not equal to j in the first paragraph of the above-mentioned formula) which is defined as an evaluation function for determining weighting factors and a learning rule of a neuron model, by Hopfield, decreases by varying of each neuron model when neuron models vary their interior condition based upon formulae (1) in an asynchronous manner. When formula (2) becomes a minimum value or a local minimum value, activities or output values of the neuron models converge.

When analysis is to be carried out using a Hopfield model, the following works 1) to 4) are necessary for preparation. That is, 1) Converting a specific object function which is given for analysis, to a form of formula (2).
2) Converting independent variables specifically constituting the object function so as to be activities or output values Ui of neuron models, and determining a conversion rule of the activities or output values Ui, the conversion rule being similar to the formula (1).
3) Determining an input pattern to each Ui, that is the initial value of each Ui, so as to be able to be converged to a pattern finally.
4) Repeating the same information processing using the learning rule obtained at 1) and 2) until an output pattern converges or a function En becomes minimum.

Among these works, works 1) and 2) are very difficult and it is highly possible not to convert suitably, therefore an extremely great amount of work is needed. As to the work 3), the output pattern may converge or not depending upon a given input pattern. Therefore, it is difficult to determine an input pattern which gives a high convergence, and a different solution may be obtained depending upon a given input pattern. As to the work 4), it takes a fairly long time from varying of the inner state of one of the neuron models to a new stable state settled by propagating an unbalanced state caused by the variation to the entirety of the Hopfield model. Therefore, it may take an extremely long time to obtain the convergence values by performing information processing in an asynchronous manner.

As is apparent from the foregoing, it is almost impossible to employ a Hopfield model for analyzing magnetic field sources for practical use.

While only the application for analysis of magnetic field sources is described in the foregoing, similar disadvantages arise when the system is applied o analysis of other physical sources, such as pressure sources and temperature sources, a regulating rule of the system including the physical sources being able to be expressed by numerical formulae, and linear addition being realized in the system.

The present invention was made to solve the above-mentioned problems. It is an object of the present invention to supply novel methods and apparatus for analyzing physical quantities, the methods and apparatus performing analyzing of a physical source with ease and at a high speed based upon measured values obtained at plural points, and an apparatus for reducing line spectrum noise.

DISCLOSURE OF THE INVENTION

To perform the object above-mentioned, a method for analyzing physical quantities according to claim 1 is a method for analyzing a physical quantity of each physical source based upon physical quantities measured at predetermined points apart from the physical sources, in the case that physical quantities measurable at arbitrary points apart from the individual physical source can be calculated based upon predetermined operation formulae which include physical quantities of physical sources and observation conditions, and physical quantities measurable at arbitrary points apart from plural physical sources can satisfy linear addition.

The first step according to a method of the invention is operating plural physical formulae based upon known information, the physical formulae being determined corresponding to species of physical quantities.

Second, a difference is calculated between a measured physical quantity and a value obtained by cumulatively adding operation results of the physical formulae.

Then, plural variables are corrected based upon the calculated difference, the variables being included in each physical formula.

The final step is outputting corrected variables included in each physical formula as analysis results of physical quantities after repeating the series of processing until the difference becomes sufficiently small.

As to the method for analyzing physical quantities according to claim 1, plural physical formulae are operated based upon known information. The physical formulae are determined corresponding to species of physical quantities (that is, the physical formulae have different constants from one another). An estimated value corresponding to a measured value is obtained by cumulatively adding operation results of the physical formulae, when physical quantities of physical sources, which are measurable at arbitrary points apart from individual physical sources and satisfy linear addition, are analyzed based upon physical quantities measured at plural points. Then, a difference between measured physical quantity and a value obtained by cumulatively adding the operation results of the physical formulae is obtained, and variables included in each physical formula are corrected based upon the calculated difference so as to vary the variables to decrease the difference. Thereafter, variables are further varied to decrease the difference to a sufficiently small value by repeating the above mentioned series of processing based upon the varied variables. When the above-mentioned series of processing are repeated until the difference becomes a sufficiently small value, the estimated value can be approximated to a measured value with extremely high accuracy. Thereby, analysis results of physical quantities can be obtained by outputting the corrected variables included in the physical formulae at the time as analysis results of physical quantities.

In this method, it is sufficient that constants, included in known physical formulae, which constants should be determined corresponding to physical quantities, are varied corresponding to the difference between the cumulatively added result and the measured result, and therefore processing as a whole can be simplified and the required time period for analysis can be extremely shortened. Analysis of physical quantities can be performed using a conventional artificial neural network and using a measured result as a teacher signal.

But, operation formulae themselves should be determined by learning, and the required time period for studying becomes extremely long. Thus, the conventional artificial neural network cannot be applied when realtime learning is required. Also, conventional artificial neural network cannot be applied to analysis of physical quantities when a physical rule to be treated is complicated. It is not assured that the analysis result of physical quantities with predetermined accuracy is obtained, because operation formulae themselves are determined by learning. It can be thought that analysis of physical quantities are performed after operation formulae which are for analyzing physical quantities from a measured result based upon known physical formulae. A disadvantage arises in that the operation formulae become extremely complicated following an increase in the number of physical sources, or that proper operation formulae may not be obtained. The method employing a conventional artificial neural network can be applied to only a specific system, and it is required to redetermine operation formulae when a specific system is changed to another system. A disadvantage arises in that general use is scarcely performed. On the contrary, the invention according to claim 1 applies known physical formulae as they are and performs an operation. Therefore, determination of physical formulae is easy and operation results are obtained with accuracy. And, the required time period for analysis can be extremely shortened, because only constants which are included in the physical formulae, which constants should be determined corresponding to physical quantities, are corrected.

An apparatus for analyzing physical quantities according to claim 2 is an apparatus for analyzing a physical quantity of each physical source based upon physical quantities measured at predetermined points apart from the physical sources, where physical quantities measurable at arbitrary points apart from the individual physical source can be calculated based upon predetermined operation formulae which include physical quantities of physical sources and observation conditions, and physical quantities measurable at the arbitrary points apart from plural physical sources satisfy linear addition. The apparatus comprises physical formula operating means for operating the operation formulae, the number of physical formula operating means being more than the number of reasons for physical quantities which are objected to analysis.

The apparatus also includes cumulative addition means for cumulatively adding operation results output from each physical formula operating means, error calculating means for receiving cumulatively added operation result output from the cumulative addition means and a measured value of a physical quantity, and for calculating an error, and for feedbacking the calculated error to each physical formula operating means, and corrected result collecting means, for collecting results which are corrected based upon the calculated error of causes of physical quantities in each physical formula, and for outputting the collected results as analysis results of physical quantities of physical sources.

As to the apparatus for analyzing physical quantities according to claim 2, operations based upon the physical formulae are carried out by the physical formula operating means. The number of physical formula operating means is greater than the number of causes of physical quantities which are objected to analysis. Operation results output from each physical formula operating means are cumulatively added by the cumulative addition means. An error is calculated by the error calculating means by receiving the cumulatively added operation result output from the cumulative addition means and a measured value of a physical quantity. Correction at the physical formula operating means is carried out by feeding back the calculated error to the physical formula operating means, when physical quantities of physical sources, which are able to be calculated based upon predetermined operation formulae at arbitrary points apart from individual physical sources and satisfy linear addition, are calculated based upon physical quantities measured at plural points. Thereafter, results, which are corrected based upon the calculated error of the causes for physical quantities in each physical formula operating means, are collected and output as analysis results of physical quantities of physical sources by the corrected result collecting means.

More particularly, when physical quantities of physical sources are able to be calculated based upon predetermined operation formulae at arbitrary points apart from individual physical sources and when physical quantities generated by each physical source at observation points satisfy linear addition the physical quantities are calculated based upon physical quantities measured at plural points, and a plurality of known information exists, such as measuring time, measuring location, and the like. Therefore, the invention supplies each known piece of information to the physical formula operating means so as to obtain corresponding operation results under the condition that variables included in the operation formulae of the physical formula operating means are determined as arbitrary values. The invention then obtains a cumulatively added value, that is a value corresponding to a measured value of a physical quantity by supplying the operation results output from each physical formula operating means to the cumulative addition means. In this case, the obtained cumulatively added value probably does not coincide with the measured value of the physical quantity, because the variables are determined arbitrarily. However, the invention supplies the cumulatively added value and the actual measured value of the physical quantity to the error calculating means so as to calculate an error between both values, and feedbacks the calculated error to each physical formula operating means so as to vary the variables of each physical formula operating means to decrease the error by correcting the determined values of the variables corresponding to the error.

Consequently, the error between both values can be made extremely small by repeating the above-mentioned series of processing for a required number of times. And, quantities of physical sources can be obtained by collecting and outputting the variables from the corrected result collecting means, the variables being determined at each physical formula operating means at the time.

In this case, it may be thought that the finally obtained analysis result may be a local minimum. However, this invention obtains an accurate analysis result other than a local minimum finally, because all of the variables of the physical formula operating means are varied based upon the calculated error so as to vary the variables to decrease fluctuation over the entirety of a system.

Furthermore, the quantity of operations can extremely be decreased in comparison with a conventional method, because the required operations are only operations in the physical formula operating means, cumulative addition in the cumulative addition means, error calculation in the error calculating means, and correcting operations of variables by correcting means based upon the feed back error.

An apparatus for analyzing physical quantities according to claim 3 is an apparatus in which the physical quantity measurable at arbitrary points apart from individual physical sources is a quantity of fluorescence labeled material which are constrained to neighboring a light guide by an antigen-antibody reaction. The predetermined formula is an experimental formula regulating intensity of fluorescence output from the light guide corresponding to introducing an exciting light in the light guide which exciting light propagates in a total reflection manner. The number of physical formula operating means is a predetermined number which is not lesser than a number of unknowns included in the experimental formula, and the corrected result collecting means outputs corrected unknowns as immunity measured results, which corrected unknowns correspond at least to immunity fluorescence and non-specific adsorption fluorescence.

As to the apparatus for analyzing physical quantities according to claim 3, plural experimental formulae, constant values of each experimental formula being different from one another, are operated by supplying known information (for example, time) to plural physical formula operating means. The known information is obtained after beginning immunity measurement by introducing the exciting light in the light guide. An estimated intensity of fluorescence corresponding to the measured intensity of fluorescence is obtained by cumulatively adding the operation results of the experimental formulae. Then, a difference between the estimated intensity of fluorescence and the measured intensity of fluorescence by the error calculating means is obtained.

Constant values in each physical formula operating means are corrected by feeding back the calculated error to each physical formula operating means. The above-mentioned series of processing are repeated until the error calculated by the error calculating means becomes sufficiently small. When the error becomes sufficiently small, the corrected constants corresponding at least to immunity fluorescence and non-specific adsorption fluorescence are output as immunity measurement results by the corrected results collecting means.

In a conventional method, immunity measurement accuracy is lowered by being influenced by fluorescence caused by a light guide and the like, and it takes a long time until the immunity measurement results are obtained. On the contrary, the invention can obtain immunity measurement results with high accuracy and within a short time by using only data which obtained at the initial stage of immunity measurement.

An apparatus for analyzing physical quantities according to claim 4 is an apparatus for which the physical quantity measurable at arbitrary points apart from individual physical sources is a quantity of material which is generated or consumed under the existence of an enzyme. The predetermined formula is a formula regulating the strength of an electric signal output from a base electrode, which supports an enzyme-immobilized membrane, corresponding to the deposition of a test solution on the enzyme-immobilized membrane, directly or indirectly. The number of physical formula operating means is a predetermined number which is not less than a number of unknowns included in the formula, and the corrected result collecting means outputs corrected unknowns as measured concentration results of corresponding material which corrected unknowns correspond at least to the concentration of material which reacts under the existence of the enzyme.

As to the apparatus for analyzing physical quantities according to claim 4, plural formulae, constant values of each formula being different from one another, are operated on by supplying known information (for example, time) to plural physical formula operating means, the known information being obtained after depositing test solution onto the enzyme-immobilized membrane. An estimated electric signal corresponding to measured electric signal, which corresponds to the quantity of material generated or consumed by the reaction of the material included in the test solution, is obtained by cumulatively adding the operation results of the formulae. Then a difference is obtained between the estimated electric signal and the measured electric signal by the error calculating means. Constant values in each physical formula operating means are corrected by feeding back the calculated error to each physical formula operating means. The above-mentioned series of processing is repeated until the error calculated by the error calculating means becomes sufficiently small. When the error becomes sufficiently small, the corrected constants correspond at least to the concentration of the material which reacts under the existence of the enzyme, and are output as measured concentration results of the material by the corrected results collecting means.

In a conventional method, concentration measurement accuracy is lowered by being influenced by the thickness of the membranes, the mounting condition of the membranes onto a base electrode and the like, and it takes a long time until measured concentration results are obtained when measured concentration signal is waited until the electric signal becomes stable. On the contrary, the invention can obtain measured concentration results with high accuracy and within a short time by using only data obtained at the initial stage of concentration measurement.

An apparatus for analyzing physical quantities according to claim 5 is an apparatus for analyzing a physical quantity of each physical source based upon physical quantities measured at predetermined points apart from the physical sources, the physical quantity to be analyzed being physical characteristics of the physical source, in the case that physical quantities measurable at arbitrary points apart from the individual physical source can be calculated based upon predetermined operation formulae which include physical quantities of physical sources and observation condition, and physical quantities measurable at the arbitrary points apart from plural physical sources satisfy linear addition. The apparatus comprises wave radiating means for radiating a wave to physical sources, and wave receiving means for receiving reflected waves from the physical sources, and for obtaining a measurement value of the physical quantity. The apparatus also includes plural physical formula operating means for operating physical formulae which correspond to the physical characteristics, cumulative addition means for cumulatively adding operation results output from each physical formula operating means and error calculating means for receiving the cumulatively added result output from the cumulative addition means and a measured value of the physical quantity which is obtained by the wave receiving means, and for calculating an error. The apparatus further includes correcting means for correcting a value of each physical formula operating means based upon the calculated error, the value regulating a cause of the physical quantity, and corrected result collecting means for collecting results which are corrected by the correcting means, and for outputting the collected results as analysis results of physical quantities of physical sources.

As to the apparatus for analyzing physical quantities, a wave is radiated to physical sources by the wave radiating means, and reflected waves from the physical sources are received by the wave receiving means so as to obtain measurement values of the physical quantities. Operations of the physical formulae are carried out by the physical formula operating means which number more than the number of causes for the physical quantities which are objected to analysis. Operation results output from each physical formula operating means are cumulatively added by the cumulative addition means, and an error is calculated by the error calculating means by receiving the cumulatively added result output from the cumulative addition means and a measured value of a physical quantity. Correction at the physical formula operating means is carried out by the correcting means, when the physical quantities of the physical sources are able to be calculated based upon predetermined operation formulae at arbitrary points apart from individual physical sources and satisfy linear addition, based upon physical quantities measured at plural points, the physical quantity to be analyzed being the physical characteristics of the physical source. Thereafter, results, which are corrected based upon the calculated error of causes for the physical quantities in each physical formula calculating means, are collected and output as analysis results of physical quantities of physical sources by the corrected result collecting means.

Therefore, the invention can obtain measurement results of physical quantities with high accuracy and within a short time as similar as the case of claim 2. The reason is that an equivalent condition, in which physical sources themselves radiate some physical quantities externally, can be generated by radiating a corresponding wave to the physical sources so as to be reflected by the physical sources, when the physical quantities objected to analysis are quantities which are not actively radiated externally from the physical sources, for example, when the physical quantities objected to analysis are infrared adsorption rate, ultrasonic reflection rate, and others.

An apparatus for reducing line spectrum noise according to claim 6 is an apparatus for reducing line spectrum noise from a measured signal which includes line spectrum noises. The apparatus comprises physical formula operating means for operating the physical formulae corresponding to line spectrum noises, the number of physical formula operating means corresponding to a number of species of line spectrum noises, cumulative addition means for cumulatively adding operation results output from each physical formula operating means, error calculating means for receiving the cumulatively added result output from the cumulative addition means and a measured spectrum signal, and for calculating an error, and correcting means for correcting a value of each physical formula operating means based upon the calculated error, the value regulating a cause of the line spectrum.

As to the apparatus for reducing line spectrum noise, operations of the physical formulae corresponding to each line spectrum noises are performed by physical formula operating means, which corresponds to the number of species of line spectrum noises, and operation results output from each physical formula operating means are cumulatively added by the cumulative addition means. The cumulatively added result output from the cumulative addition means and the measured spectrum signal are supplied to the error calculating means so as to calculate the error of the cumulatively added result with respect to the measured result, and the value of each physical formula operating means is corrected based upon the calculated error by the correcting means, the value regulating a cause of the line spectrum.

After correction of the value regulating a cause of the line spectrum is finished, a signal with line spectrum noise reduced from the spectrum signal is output from the error calculating means by interpreting only the correcting processing by the correcting means. Therefore, there is no need to collect values corrected by each correcting means. The apparatus for reducing line spectrum noise can be more simplified in its arrangement as a whole, and can obtain an observation signal with high quality which is reduced only by line spectrum noises.

BRIEF DESCRIPTION OF THE DRAWING

FIG. 23 is a diagram schematically illustrating an arrangement of a hierarchical perception;

FIG. 24 is a diagram illustrating a relationship between an error and a number of times of learning of the hierarchical perceptron;

BEST MODES FOR EXECUTING THE INVENTION

Referring to the attached drawings, we explain the present invention in detail.

Figure 1:
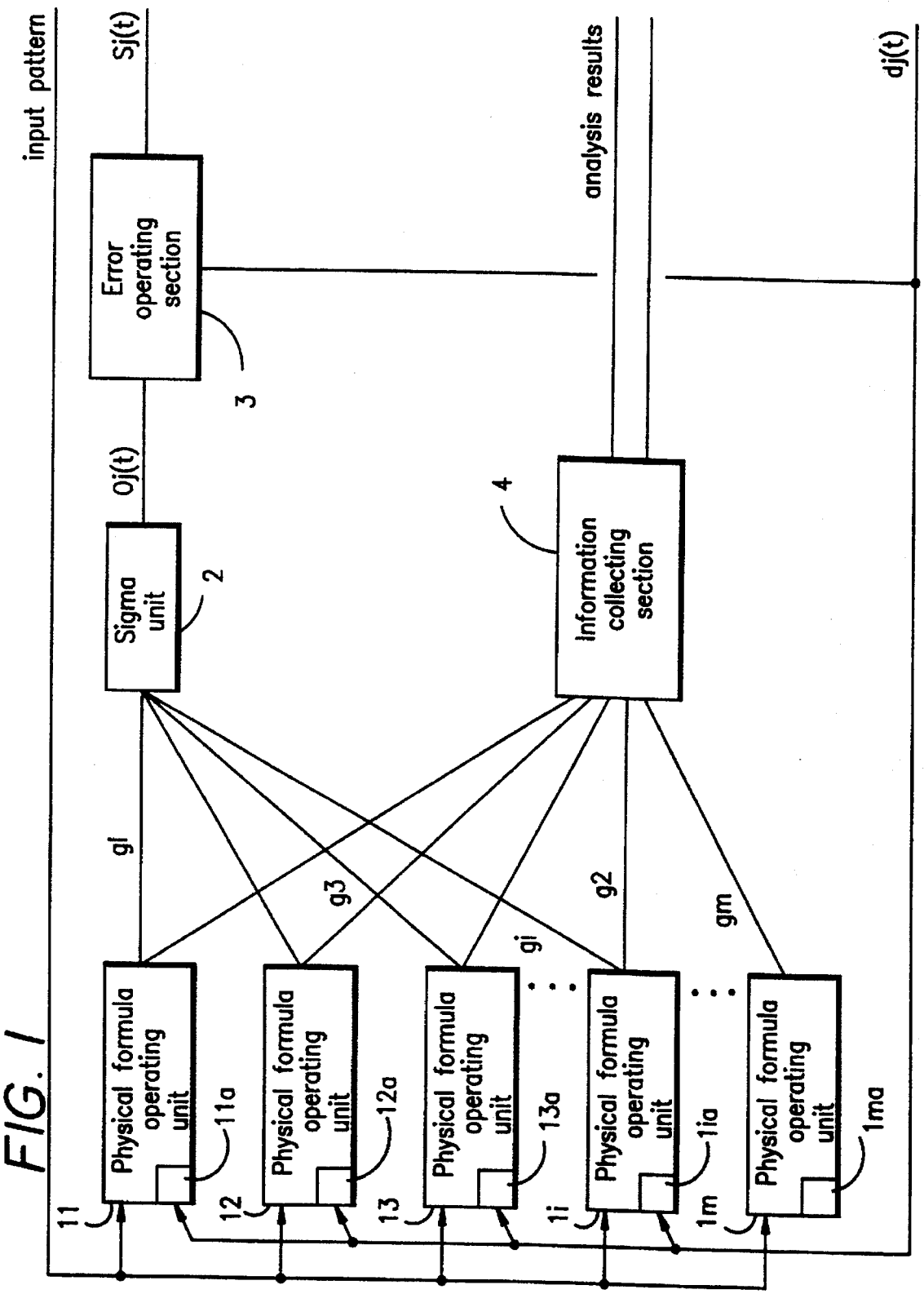
FIG. 1 is a block diagram illustrating a physical quantity analyzing apparatus according to an embodiment of the present invention.

FIG. 1 is a block diagram illustrating a physical quantity analyzing apparatus according to an embodiment of the present invention.

The physical quantity analyzing apparatus includes plural physical formula operating units 11, 12, ... 1m, a sigma unit 2 for cumulatively adding operation results g1, g2, ... gm output from the physical formula operating units 11, 12, ... 1m, an error operating section 3 for receiving both the cumulatively added result Oj(t) output from the sigma unit 2 and a measured value Sj(t) of a physical quantity as a teacher pattern, and for calculating a difference between them both, correcting sections 11a, 12a, ... 1ma for correcting estimated variables in the physical formula operating units based upon the calculated error, and an information collecting section 4 for collecting the estimated variables in the physical formula operating units 11, 12, ... 1m and for outputting the estimated variables as analysis results therefrom.

The physical formula operating units 11, 12, ... 1m perform operations of physical formulae based upon known information in response to being supplied known information such as time t, measuring locations and the like, the physical formulae being determined in each physical formula operating unit, and corrected variables included in the physical formulae in response to being supplied the estimated error dj (t) {=Sj (t)–Oj (t)} output from the error operating section 3 so as to decrease the estimated error. The number of physical formula operating units is determined so as to be greater than the number of causes of the physical quantities which are objected to analysis. The physical formula operating units may be controlled to operate in a manner synchronous to one another, or may be controlled to operate in an asynchronous manner.

Operations of the physical quantity analyzing apparatus having the above-mentioned arrangement are as follows.

It is supposed that the physical quantity Oj(t) which is objected to analysis is given by the following equation.

$$Oj(t) = \sum_{i=1}^{m} gi(t, ai1, ai2, ai3, \ldots aiL) \qquad (3)$$

That is, it is supposed that the physical quantity Oj(t) is a linear add of m-numbered functions gi(t, ai1, ai2, ai3, ... aiL) which have time t and L-numbered unknowns ai1, ai2, ai3, ... aiL. The functions gi may include known information in their formula. Such an assumption is never unnatural. Such an assumption is effected when pressure, temperature, sound waves, electromagnetic waves, electric fields, magnetic fields, light waves, gravity, corpuscular rays or the like are objected to analysis.

Under the assumption, functions g1, g2, ... gm are calculated by supplying known information such as a time t, measuring locations and the like, to the m-numbered physical formula operating units 11, 12, ... 1m. A cumulatively added value Oj(t) can be obtained by supplying all calculated function values to the sigma unit 2. In this case, the obtained cumulatively added value Oj(t) is different from an actually measured value Sj(t) because the variables are determined arbitrarily. Therefore, a difference between the actually measured value Sj(t) and the cumulatively added value Oj(t) is calculated by the error operating section 3. The calculated difference is fed back as an estimated error dj(t) to the correcting sections 11a, 12a, ... 1ma of the physical formula operating units 11, 12, ... 1m, and unknowns in the physical formula operating units are varied so as to decrease the estimated error dj(t).

The estimated error dj(t) decreases following repetition of the above-mentioned series of processing, and finally becomes nearly equal to 0. Analysis results according to physical quantities of physical sources are then obtained by collecting and outputting values of unknowns in the physical formula operating units 11, 12, ... 1m by the information collecting unit 4.

When an estimated error evaluating function Ej(t) is defined by the following equation, equation (4) is obtained.

$$Ej(t)=(1/2)\{Sj(t)-Oj(t)\}^2 \partial Ej(t)/\partial Oj(t)=-\{Sj(t)-Oj(t)\} \quad (4)$$

When it is supposed that the correcting of unknowns in each physical formula operating unit is performed based upon a maximum slope decreasing method, estimation of unknowns for minimizing a value of the estimated error evaluating function can be performed based upon equation (5). In equation (5), $\epsilon k$ represents a learning gain (correcting gain) of an unknown ai.

$$\begin{aligned} aik &= aik - \epsilon k\{\partial Ej(t)/\partial aik\} \quad (5)\\ &= aik - \epsilon k\{(\partial Ej(t)/\partial Oj(t)\}\{\partial Oj(t)/\partial aik\}\\ &= aik + \epsilon k\{Sj(t) - Oj(t)\}\{\partial Oj(t)/\partial aik\} \end{aligned}$$

The following equation is obtained from equation (3).

$$\partial Oj(t)/\partial aik = \partial \left\{ \sum_{i=1}^{m} gi(t, ai1, ai2, ai3, \ldots aiL) \right\}/\partial aik = \quad (6)$$

$$\partial\{gi(t, ai1, ai2, ai3, \ldots aiL)\}/\partial aik$$

And, the following equation is obtained by substituting equation (6) for equation (5).

$$aik=aik+\epsilon K\{Sj(t)-Oj(t)\}[\partial\{gi(t, ai1, ai2, ai3, \ldots aiL)\}/\partial aik] \quad (7)$$

Consequently, estimation accuracy of unknowns is improved by carrying out processing of the equation (7) so as to obtain more accurate physical quantities, when a physical model can be expressed by physical formulae gi(t, ai1, a2, ai3, ... aiL) and estimated physical quantities can be calculated by equation (3).

Figure 2:
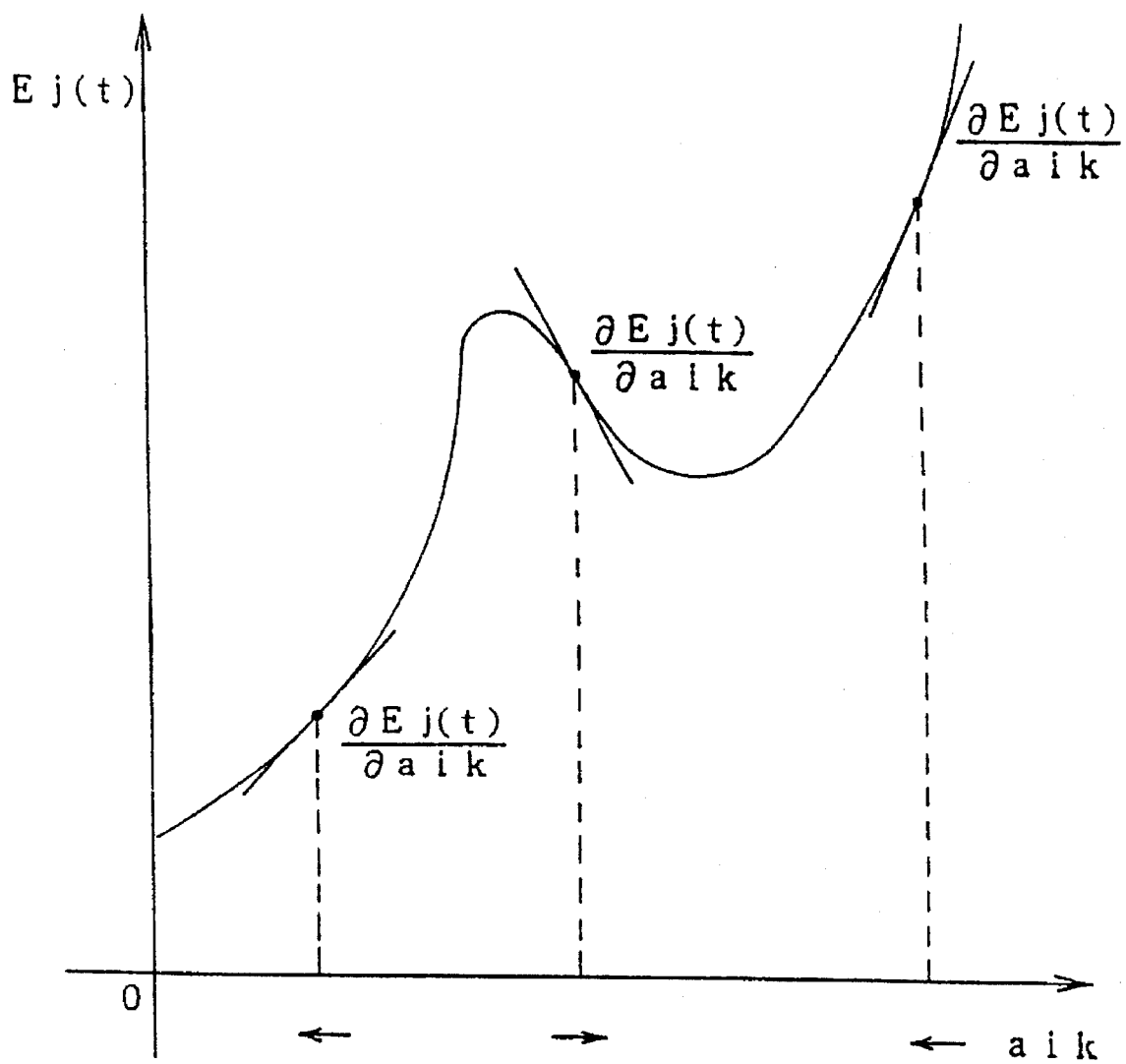
FIG. 2 is a diagram illustrating an example of an estimated error evaluating function.

FIG. 2 is a diagram illustrating an example of an estimated error evaluating function.

Estimating operation of unknowns which minimize a value of the estimated error evaluating function is described, together with FIG. 2 and table 1 which indicates conditions of the estimated error evaluating function. In table 1, $\Delta ik$ is a correction value according to an unknown $\Delta x$.

TABLE 1

| aik | ← decrease | | increase → | |
|---|---|---|---|---|
| Ej (t) | ↗ | local maximum ↘ | local minimum ↗ | |
| $\frac{\partial Ej(t)}{\partial aik}$ | positive | 0 | negative 0 | positive |
| Δaik | negative | undefined | positive 0 | negative |

As mentioned in the foregoing, it is sufficient that the estimating of unknowns is performed to decrease the value of the estimated error evaluating function. Therefore, the correction value Δaik is determined to be negative when a slope of the estimated error evaluating function is positive, and it is determined to be positive when a slope of the estimated error evaluating function is negative, by taking a sign of the slope of the estimated error evaluating function Ej(t). It may be thought that an unknown aik corresponding to a local minimum is obtained when the above-mentioned estimation of unknowns is performed, because FIG. 2 includes a local minimum point. The estimation processing is not performed for only one unknown, but is performed for all unknowns in a synchronous manner, thereby the estimated error evaluating function itself is varied following repetition of the estimation processing. As a result, unknowns which minimize the value of the estimated error evaluating function are obtained finally. Thereafter, analysis of physical quantities can be performed by collecting and outputting the finally obtained unknowns by the information collecting unit 4.

SPECIFIC EXAMPLE 1

Figure 3:
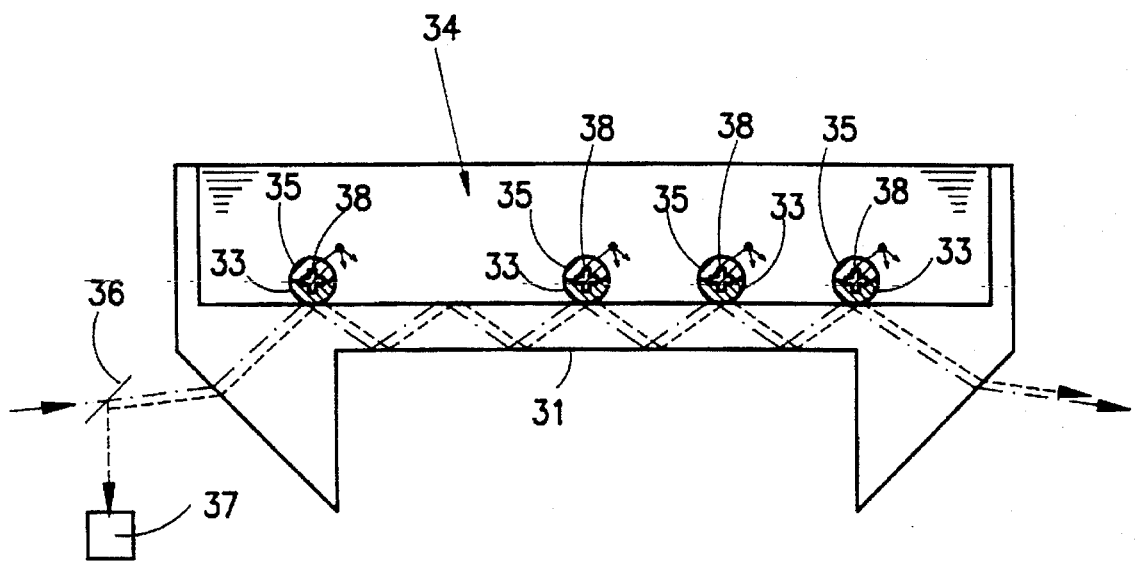
FIG. 3 is a schematic view illustrating an example of an immunity measuring apparatus using fluorescence.

FIG. 3 is a schematic diagram illustrating an example of an immunity measuring apparatus using fluorescence.

When immunity measurement is carried out using the immunity measuring apparatus, a vessel 32 for reaction is provided at one side of a light guide 31, antigen 33 for example, is fixed at a boundary face of the vessel 32 for reaction with the light guide 31. Test solution 34 is injected into the vessel 32 for reaction so as to perform an antigen-antibody reaction under the condition that exciting light is guided into the light guide 31 so as to propagate in the interior of the light guide 31 in a total reflection manner, a quantity of antigen-antibody reaction corresponding to a degree of immunity. Then, a labeled antibody 35 which is obtained by labeling an antibody with fluorescent material is injected into the vessel 32 for reaction. Only the portion of the labeled antibody 35 constrained close to the boundary face is excited by the evanescent wave component of the exciting light. The excited fluorescence propagates in the interior of the light guide 31 in a total reflection manner, and leaves via an exciting light incidenting face 31a of the light guide 31. The outgone fluorescence is separated by a beam splitter 36 and the like from the exciting light, and is guided to an optical sensor 37 such as a photomultiplier so as to obtain a measured signal.

Figure 4:
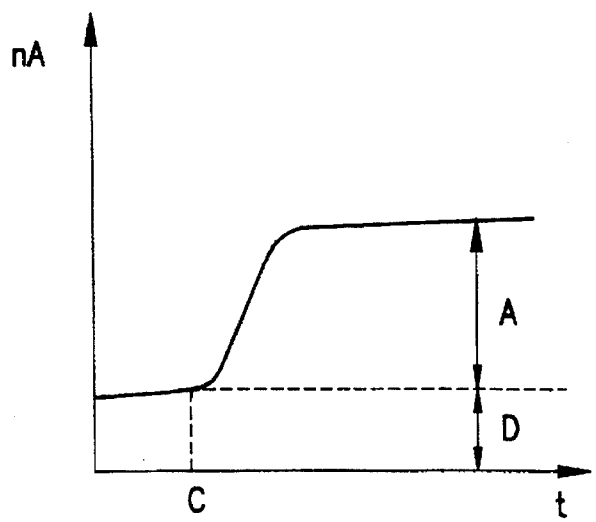
FIG. 4 is a schematic diagram illustrating varying of a measured signal following the passage of time, the measured signal being obtained by the immunity measuring apparatus illustrated in FIG. 3.

FIG. 4 is a schematic diagram illustrating the varying of a measured signal following the passage of time, the measured signal being obtained by the above-mentioned immunity measuring apparatus.

An offset caused by fluorescence and the like generated by the light guide 31 itself is obtained as the measured signal until the labeled antibody 35 is injected into the vessel 32 for reaction. After the labeled antibody 35 is injected into the vessel 32 for reaction, the labeled antibody 35 performs an antigen-antibody reaction with the antigen 38 which has performed the antigen-antibody reaction so that the labeled antibody 35 is constrained close to the boundary face. As the quantity of the constrained labeled antibody 35 gradually increases, the measured signal increases like an exponential function with respect to the offset, and finally becomes a predetermined value which is determined based upon the degree of immunity reaction.

Therefore, the degree of immunity cannot be measured accurately when not only the finally obtained measured signal but also the offset are not obtained accurately. By taking the point into consideration, it can be thought that the offset is estimated using a least square method (primary regression) of linear approximation. An error causes a wide variance in the estimation of the offset depending upon the degree of immunity, so that immunity measurement cannot be performed with high accuracy.

However, the quantity of immunity reaction can be estimated with high accuracy by using the physical source analyzing apparatus having the arrangement in FIG. 1.

That is, it is experimentally recognized that the measurement signal corresponding to the outgone fluorescence can be calculated based upon the following equation. In the equation, A indicates a sum of immunity fluorescence and non-specific adsorption fluorescence, B indicates a value depending upon the density of immunity antibody, C indicates a beginning time of the reaction, and D indicates an offset of the light guide 31.

$$gj(t)=A\{1-e^{-B(t-C)}\}+D \qquad (8)$$

In this case, the number of physical formula operating units is 4, because the number of unknowns to be estimated is 4. Each physical formula operating unit is determined to perform processing based upon the equation (8). The unknowns A, B, C, and D are given arbitrary initial values.

Figure 5:
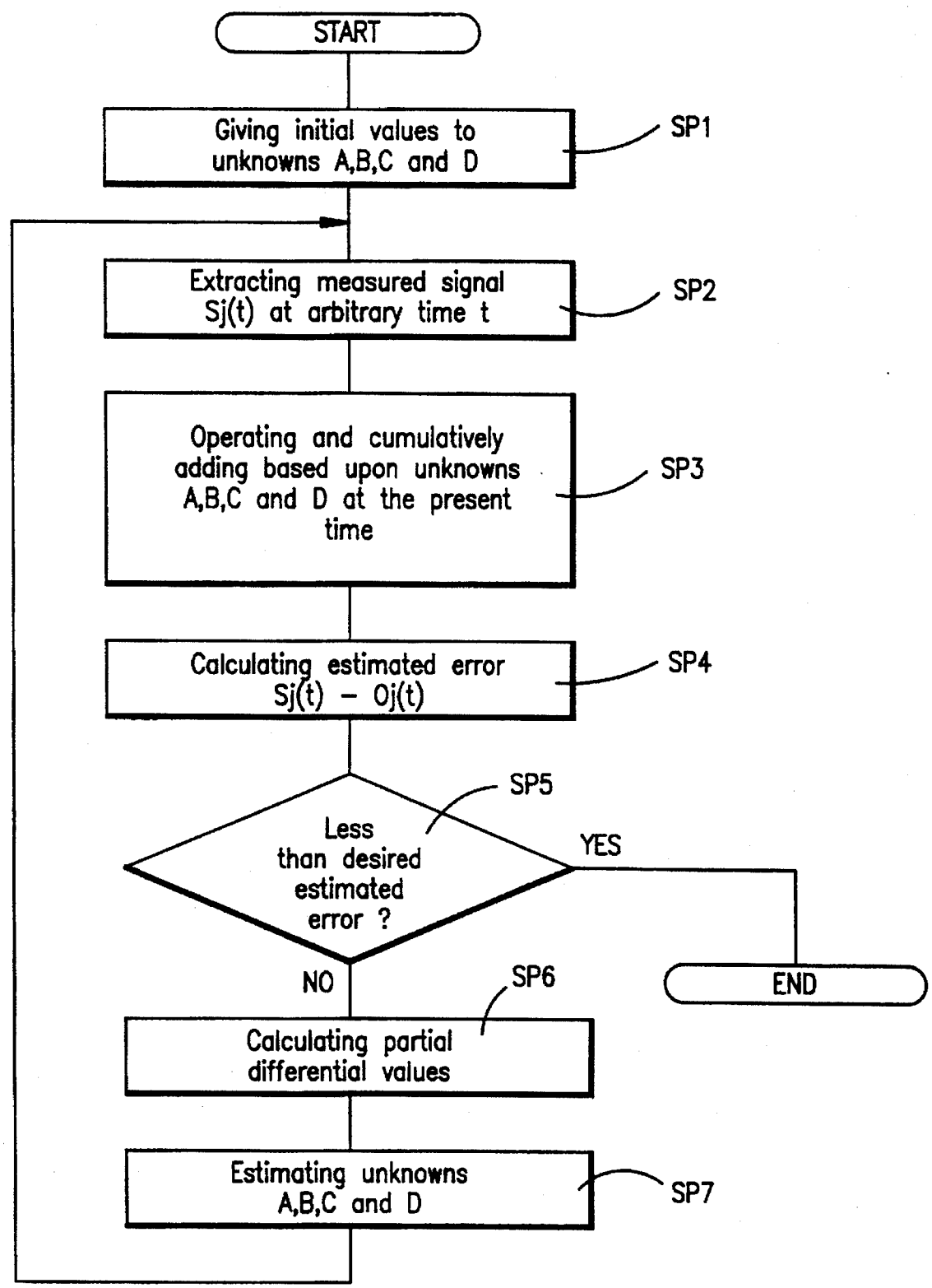
FIG. 5 is a flowchart explaining an immunity measuring process using the physical quantity analyzing apparatus illustrated in FIG. 1.

The above-mentioned unknowns A, B, C and D are estimated with high accuracy by carrying out a processing based upon the flowchart illustrated in FIG. 5, when time is supplied to the physical source analyzing apparatus which is initially determined, as a common measurement condition, and a measured signal which is obtained according to the supplied time is supplied as a teacher signal. That is, the degree of immunity reaction can be estimated with high accuracy.

More particularly, partial differential values of the measured signal are given by the following equations, because it is experimentally known that the measured signal can be calculated by equation (8).

$$\begin{aligned}
\partial Oj(t)/\partial A &= 1 - e^{-B(t-C)} \\
\partial Oj(t)/\partial B &= A(t-C)e^{-B(t-C)} \\
\partial Oj(t)/\partial C &= -A B e^{-B(t-C)} \\
\partial Oj(t)/\partial D &= 1
\end{aligned} \qquad (9)$$

As a result, estimating rules of unknowns A, B, C and D are as follows.

$$\begin{aligned}
A &= A + \epsilon a & \{Sj(t) - Oj(t)\} & \quad (\partial Oj(t)/\partial A) \\
B &= B + \epsilon b & \{Sj(t) - Oj(t)\} & \quad (\partial Oj(t)/\partial B) \\
C &= C + \epsilon c & \{Sj(t) - Oj(t)\} & \quad (\partial Oj(t)/\partial C) \\
D &= D + \epsilon d & \{Sj(t) - Oj(t)\} & \quad (\partial Oj(t)/\partial D)
\end{aligned} \qquad (10)$$

Therefore, in step SP1, the unknowns A, B, C and D are given initial values. In step SP2, an arbitrary time t after beginning the immunity reaction, and the measured signal Sj(t) corresponding to the time t, are extracted. In step SP3, operations are carried out by physical formula operating units 11, 12, 13 and 14 based upon the estimated unknowns A, B, C and D at the present time, and cumulative adding is carried out by the sigma unit 2. In step SP4, a difference Sj(t)−Oj(t) between the measured signal and the cumulatively added value is calculated, and in step SP5, it is judged whether or not the calculated difference is equal to or lesser than a desired estimated error which was previously determined. When it is judged that the calculated difference is greater than the desired estimated error, in step SP6, partial differential values of the cumulatively added value are calculated by carrying out the processing of equations (9). In step SP7, the unknowns A, B, C and D are estimated by carrying out the processing of equations (10), and then processing in step SP2 is carried out again. When it is judged in step SP5 that the calculated difference is equal to or lesser than the desired estimated error which was previously determined, the series of processing is finished.

The unknowns A, B, C and D can be estimated with high accuracy by carrying out the above-mentioned series of processing. The unknowns can be estimated with high accuracy by using initial data. A required time period can be extremely shortened because processing for estimating is simplified. By estimating unknowns in a chemical reaction based upon different operating formulae, experimental formulae can be dealt with by a varying data processing part, that is in a varying software program. Of course, other parameters can be estimated.

SPECIFIC EXAMPLE 2

Figure 6:
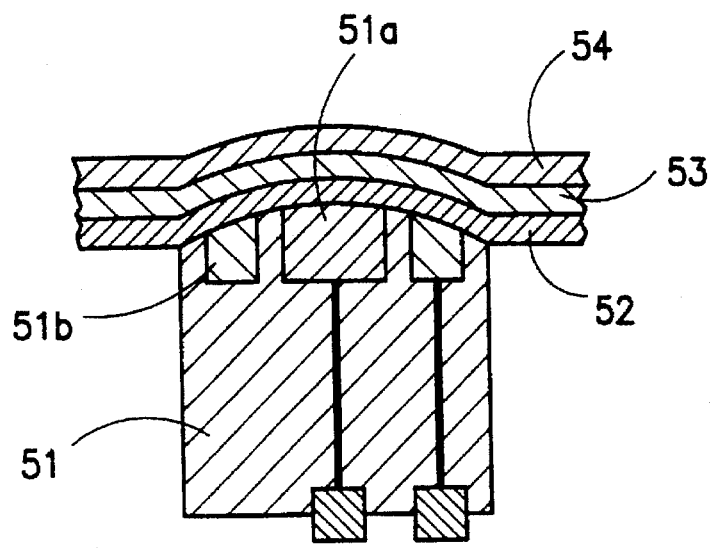
FIG. 6 is a schematic view illustrating a glucose concentration measuring apparatus.

FIG. 6 is a schematic view illustrating a glucose concentration measuring apparatus.

When measuring of the concentration of glucose is carried out using the glucose concentration measuring apparatus, for example, a hydrogen peroxide selectively penetrable membrane 52, a glucoseoxidaze (hereinafter referred to as GOD) immobilized membrane 53 which is obtained by immobilizing GOD, and a diffusion limiting membrane 54 which limits diffusion of glucose to some degree, are laminated on a surface of a base electrode 51 which includes a platinum electrode 51a and a silver electrode 51b. Test solution then is dropped onto the diffusion limiting membrane 54. Glucose in the dropped test solution has its diffusion limited to some degree by the diffusion limiting membrane 54, and glucose with a lower concentration than the glucose concentration in the test solution reaches the GOD immobilized membrane 53. The following reaction is carried out under the existence of GOD.

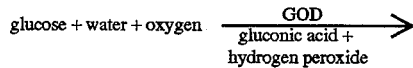

Hydrogen peroxide generated by the reaction passes through the hydrogen peroxide selective penetration membrane 52, and is guided ho the surface of the base electrode 51. A measured signal corresponding to the quantity of the hydrogen peroxide is output from the base electrode 51. Consequently, the concentration of glucose can be measured based upon the measured signal. As is apparent from the reaction formula, the quantity of glucose which can react, that is the measurable limit of concentration of glucose, is determined by the quantity of oxygen in the test solution. Therefore the measurable limit is raised by limiting the diffused quantity of glucose by interposing the diffusion limiting membrane 54 instead of directly dropping the test solutions onto the GOD immobilized membrane 53.

Figure 7:
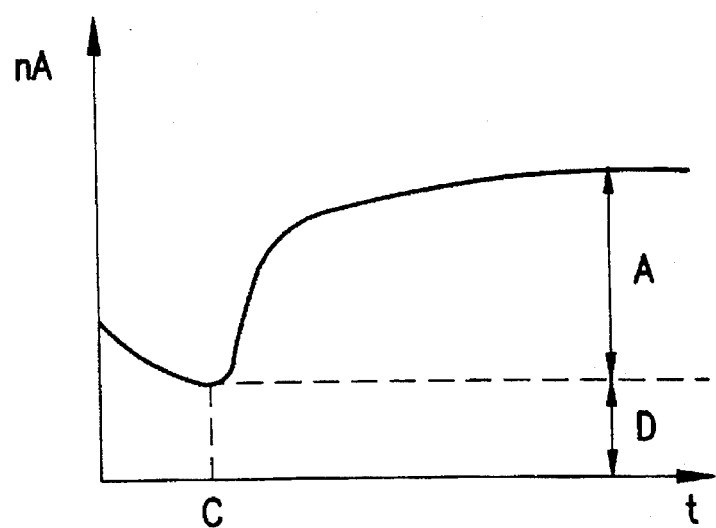
FIG. 7 is a schematic diagram illustrating varying of a measured signal following passage of time, the measured signal being obtained by the glucose concentration measuring apparatus illustrated in FIG. 6.

FIG. 7 is a schematic diagram illustrating a varying measured signal over time, the measured signal being obtained by the above-mentioned glucose concentration measuring apparatus.

The measured signal gradually decreases by being influenced by the preceding measurement until the test solution is dropped. After the test solution is dropped, the measured signal increases as an exponential function because the reaction of the above-mentioned reaction formula is carried out, and the measured signal finally becomes a predetermined value which is determined based upon the concentration of glucose. FIG. 7 illustrates a condition in which the quantity of oxygen in the test solution is sufficient.

Generally, the concentration of glucose is measured by obtaining a maximum value of the differential values of the measured signal by time, because the required time period becomes extremely long when the concentration of glucose is measured by waiting until the condition in which the measured signal does not vary. Furthermore, the obtained measured signal is influenced by not only the concentration of glucose, but also the thickness, laminated condition and the like of membranes laminated on the base electrode 51. Generally, a calibration is carried out using a solution, the glucose concentration of which is known, after exchanging of the membrane.

However, the concentration of glucose can be estimated with high accuracy by using the physical source analyzing apparatus having the arrangement in FIG. 1.

That is, it is recognized that the measured signal can be calculated based upon the following equation which can derived into a second diffusion equation. In the following equation, A indicates a product of the concentration of glucose and a quantity determined by the quality of the membrane, B indicates a numeric value corresponding to the raising speed of the reaction, C indicates a beginning time of the reaction, and D indicates a value of the measured signal at the beginning time of the reaction. It is known that B becomes great when the thickness of the membranes is thin, and that B becomes great when the concentration of glucose is high, and that the reaction converges rapidly when B is great.

$$gj(t) = A \left\{ 1 + 2 \sum_{K=1}^{\infty} (-1)^K e^{-B(t-C)} \right\} + D \quad (11)$$

In this case, a number of physical formula operating units is 4, because the number of unknowns to be estimated is 4. Each physical formula operating unit is determined to perform processing based upon equation (11). The unknowns A, B, C and D are given arbitrary initial values, respectively.

The above-mentioned unknowns A, B, C and D are estimated with high accuracy by carrying out a processing based upon the flowchart in FIG. 5, when time is supplied to the physical source analyzing apparatus which is initially determined, as a common measurement condition, and a measured signal which is obtained according to the supplied time is supplied as a teacher signal. That is, the concentration of glucose can be estimated with high accuracy.

More particularly, partial differential values of the measured signal are given by the following equations, because the measured signal can be calculated by equation (11).

$$\begin{aligned}
\partial Oj(t)/\partial A &= 1 + 2 \sum_{K=1}^{\infty} \{(-1)^K e^{-B(t-C)}\} \\
\partial Oj(t)/\partial B &= 2A(t-C) \sum_{K=1}^{\infty} \{(-1)^K e^{-B(t-C)}\} \\
\partial Oj(t)/\partial C &= -2AB \sum_{K=1}^{\infty} \{(-1)^K e^{-B(t-C)}\} \\
\partial Oj(t)/\partial D &= 1
\end{aligned} \quad (12)$$

As a result, estimating rules of unknowns A, B, C and D are as follows.

$$\begin{aligned}
A &= A + \epsilon a \{Sj(t) - Oj(t)\}(\partial Oj(t)/\partial A) \\
B &= B + \epsilon b \{Sj(t) - Oj(t)\}(\partial Oj(t)/\partial B) \\
C &= C + \epsilon c \{Sj(t) - Oj(t)\}(\partial Oj(t)/\partial C) \\
D &= D + \epsilon d \{Sj(t) - Oj(t)\}(\partial Oj(t)/\partial D)
\end{aligned} \quad (13)$$

Therefore, in step SP1, the unknowns A, B, C and D are given initial values. In step SP2, an arbitrary time t after beginning the reaction according to the reaction equation, and the measured signal Sj(t) corresponding to the time t, are extracted. In step SP3, operations are carried out by physical formula operating units 11, 12, 13 and 14 based upon the estimated unknowns A, B, C and D at the present time, and cumulative adding is carried out by the sigma unit 2. In step SP4, a difference Sj(t)−Oj(t) between the measured signal and the cumulatively added value is calculated, and in step SP5, it is judged whether or not the calculated difference is equal to or lesser than a desired estimated error which was previously determined. When it is judged that the calculated difference is greater than the desired estimated error, in step SP6, partial differential values of the cumulatively added value are calculated by carrying out the processing of equations (12). In step SP7, the unknowns A, B, C and D are estimated by carrying out the processing of equations (13), and then processing in step SP2 is carried out again. When it is judged in step SP5 that the calculated difference is equal to or lesser than the desired estimated error, the series of processing is finished.

The unknowns A, B, C and D can be estimated with high accuracy by carrying out the above-mentioned series of processing. The unknowns can be estimated with high accuracy by using initial data. A required time period can be extremely shortened because processing for estimating is simplified. By estimating unknowns in a chemical reaction based upon different operating formulae, experimental formulae can be dealt with by a varying data processing part, that is by a varying software program. Of course, other parameters can be estimated. Furthermore, it is possible that the unknown A is classified into an unknown A1 which corresponds to the concentration of glucose and an unknown A2 which corresponds to a number which is determined based upon the quality of membranes. In this case, calibration becomes unnecessary because the concentration of glucose can directly be estimated.

In the foregoing, only the immunity measurement and the concentration measurement of glucose are described. It is of course possible that the apparatus can be applied to estimating various parameters in other chemical reactions.

Second Embodiment

Figure 8:
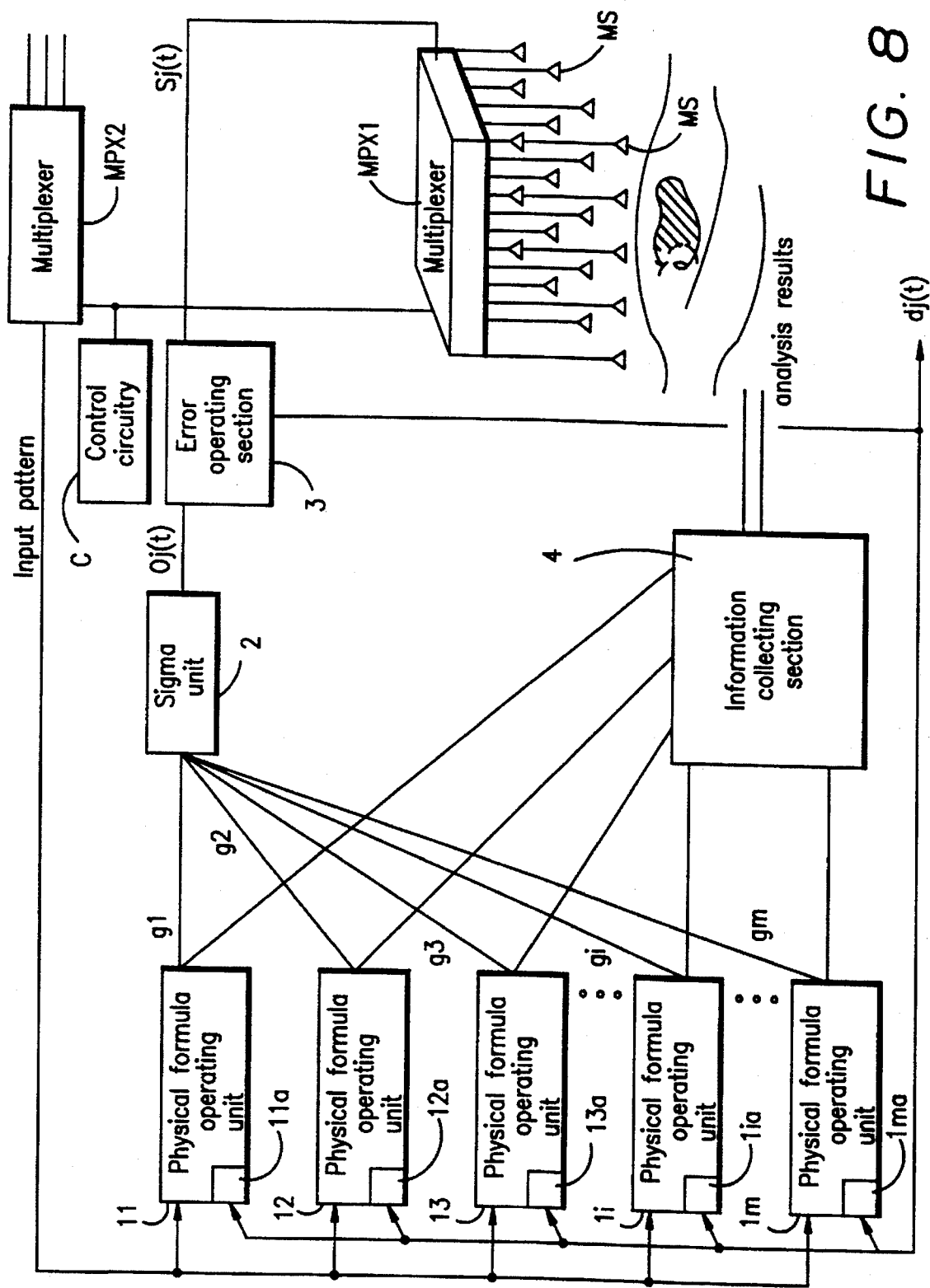
FIG. 8 is a schematic block diagram illustrating an arrangement of a magnetic source analyzing apparatus using the apparatus illustrated in FIG. 1.

FIG. 8 is a schematic block diagram illustrating an arrangement of a magnetic source analyzing apparatus using the apparatus in FIG. 1.

The apparatus differs from the apparatus of FIG. 1 in that N-numbered magnetic field sensors MS are disposed so as to detect a magnetic field, and one measured value among N-numbered measured values and its observation condition are selected by multiplexers MX1 and MX2, respectively, so as to supply the selected measured value and the observation condition to the error operating section 3 as teacher signals, the multiplexers MX1 and MX2 being controlled by a control circuitry C.

When a measured value obtained by the j-th magnetic field sensor j among the N-numbered magnetic field sensor is determined to be Bj, and when an estimated value at the measuring point j by the magnetic field sensor j is determined to be Bej, an estimated error Ej at the measuring point j by the j-th magnetic field sensor j can be expressed by the following equation.

$$Ej = (1/2)(Bj - Bej)^2$$

When Bej is formed by a magnetic field which is generated by m-numbered current elements, an estimated value Bej can be obtained based upon location information and a current vector of each current element i, and location information of the measuring point j. When a magnetic field generated at the measuring point j by the current element i is expressed as Beji, the equation (14) is effected. That is, linear addition is satisfied.

$$Bej = \sum_{i=1}^{m} Beji \quad (14)$$

When input parameters of the current element i are indicated with Wik (k=1, 2, . . . L) {for example, input parameters become Wi1=xi, Wi2=yi, Wi3=zi, Wi4=Xi, Wi5=Yi, Wi6=Zi, when the input parameters are location information Oi(xi, yi, zi) and a current vector Ii(Xi, Yi, Zi)}, and when varying a component of the input parameters Wik is indicated with ΔWik, the equation (15) should be satisfied to guide the estimated error Ej to a minimum using a maximum slope decreasing method.

$$\Delta Wik \propto -\partial Ej/\partial Wik \ldots (15)$$

By taking these relationships into consideration, the equation (16) is obtained as an operation for correcting the input parameters Wik so as to decrease the estimated error Ej.

$$\begin{aligned} Wik &= Wik - \epsilon k \cdot \partial Ej/\partial Wik \\ &= Wik - \epsilon k \, (\partial Ej/\partial Bej)(\partial Bej/\partial Beji)(\partial Beji/\partial Wik) \\ &= Wik + \epsilon k \, (Bj - Bej)(\partial Beji/\partial Wik) \end{aligned} \quad (16)$$

In the equation (16), εk indicates a learning gain, and i=1, 2, 3, . . . m, and k=1, 2, 3, . . . L.

When a measured value obtained by the j-th magnetic field sensor j among the N-numbered magnetic field sensors is determined to be Bzj, and when a magnetic field component in the z-direction is determined to be Bzeji, the magnetic field component in the z-direction being generated at a measuring point j by a current element i which has a current vector parallel to an x-y plane. It is known that the magnetic field component Bzeji is given by the following equation.

$$Bseji = (\mu O \cdot Mi/4\pi)\{(yi-yi)\cos\theta i - (xj-xi)\sin\theta i\}/\{(xj-xi)^2 + (yj-yi)^2 + (zj-zi)^2\}^{3/2}$$

In the equation, the unknowns xi, yi and zi respectively indicate x-, y-, and z-coordinates of the current element i, the unknown θi indicates an angle of the current element i with respect to the x-axis on the x-y plane, the unknown Mi indicates a moment of the current element i, and the unknowns xj, yj and zj respectively indicate x-, y-, and z-coordinates of the measuring point j. Consequently, analysis of a magnetic source based upon the maximum slope decreasing method can be performed by substituting each unknown for the equation (16). That is, the equations (17) are obtained for unknowns.

$$\left.\begin{aligned} xi &= xi + \epsilon x \, (Bzj - Bzej)(\partial Bzeji/\partial xi) \\ yi &= yi + \epsilon y \, (Bzj - Bzej)(\partial Bzeji/\partial yi) \\ zi &= zi + \epsilon z \, (Bzj - Bzej)(\partial Bzeji/\partial zi) \\ \theta i &= \theta i + \epsilon T \, (Bzj - Bzej)(\partial Bzeji/\partial \theta i) \\ Mi &= Mi + \epsilon M \, (Bzj - Bzej)(\partial Bzeji/\partial Mi) \end{aligned}\right\} \quad (17)$$

In the equations (17), x, y, z, T and M very small positive values, and are learning gains. Correcting processing of unknowns based upon the equations (17) in the physical formula operating units are determined to be carried out in a synchronous manner.

Correcting processing of the unknowns based upon the equations (17) can be performed easily, because each partial differential term included in the equations (17) can be obtained analytically based upon the equations (18). In the equation (18), X=x j−x i, Y=y j −y i, Z=z j−zi, and A=X²+Y²+Z² for the purpose of simplification of the equations.

$$\left.\begin{aligned} \partial Bzeji/\partial xi &= \{\partial Bzeji/\partial(xj-xi)\}\{\partial(xj-xi)/\partial xi\} \\ &= (\mu O \cdot Mi/4\pi)[\{3XY\cos\theta i + (A - 3X^2)\sin\theta i\}/A^{5/2}] \\ \partial Bzeji/\partial yi &= \{\partial Bzeji/\partial(yj-yi)\}\{\partial(yj-yi)/\partial yi\} \\ &= (-\mu O \cdot Mi/4\pi)[\{(A - 3Y^2)\cos\theta i + 3XY\sin\theta i\}/A^{5/2}] \\ \partial Bzeji/\partial zi &= \{\partial Bzeji/\partial(zj-zi)\}\{\partial(zj-zi)/\partial zi\} \\ &= (-\mu O \cdot Mi/4\pi)\{3z(Y\cos\theta i - X\sin\theta i)/A^{5/2}\} \\ \partial Bzeji/\partial\theta i &= (-\mu O \cdot Mi/4\pi)\{(Y\sin\theta i + X\cos\theta i)/A^{3/2}\} \\ \partial Bzeji/\partial Mi &= (\mu O/4\pi)\{(Y\cos\theta i - X\sin\theta i)/A^{3/2}\} \end{aligned}\right\} \quad (18)$$

The unknowns with high accuracy can be obtained with a relatively small number of learning times by performing magnetic source analysis using the apparatus in FIG. 8. The obtained unknowns can be collected and output as analyzed results by the information collecting unit 4.

Though the learning gains for correcting the unknowns are determined to be a sufficiently small value, a necessary number of learning times for convergence can be small because each unknown can be greatly corrected when the difference between the measured value Bzj and the estimated value Bzej is great. When the difference is small, each unknown can be corrected by an extremely small quantity, thereby accuracy of unknowns which are finally obtained, can be raised. When the difference between the measured value Bzj and the estimated value Bzej is small, and when unknowns are a local minimum (not a true solution), each unknown can be corrected so as to escape the local minimum condition because at least one partial differential term in the equation (17) has a finite value. The estimated error increases temporarily, but each unknown can be corrected so as to decrease the error again. Therefore, performing simulated annealing which is employed in the other system, is not needed.

This embodiment describes only a case in which the apparatus is applied to analysis for a magnetic source, but the apparatus can be applied in a similar manner for a system in which physical sources radiate some physical quantities (heat, electromagnetic wave and the like).

Third Embodiment

Figure 9:
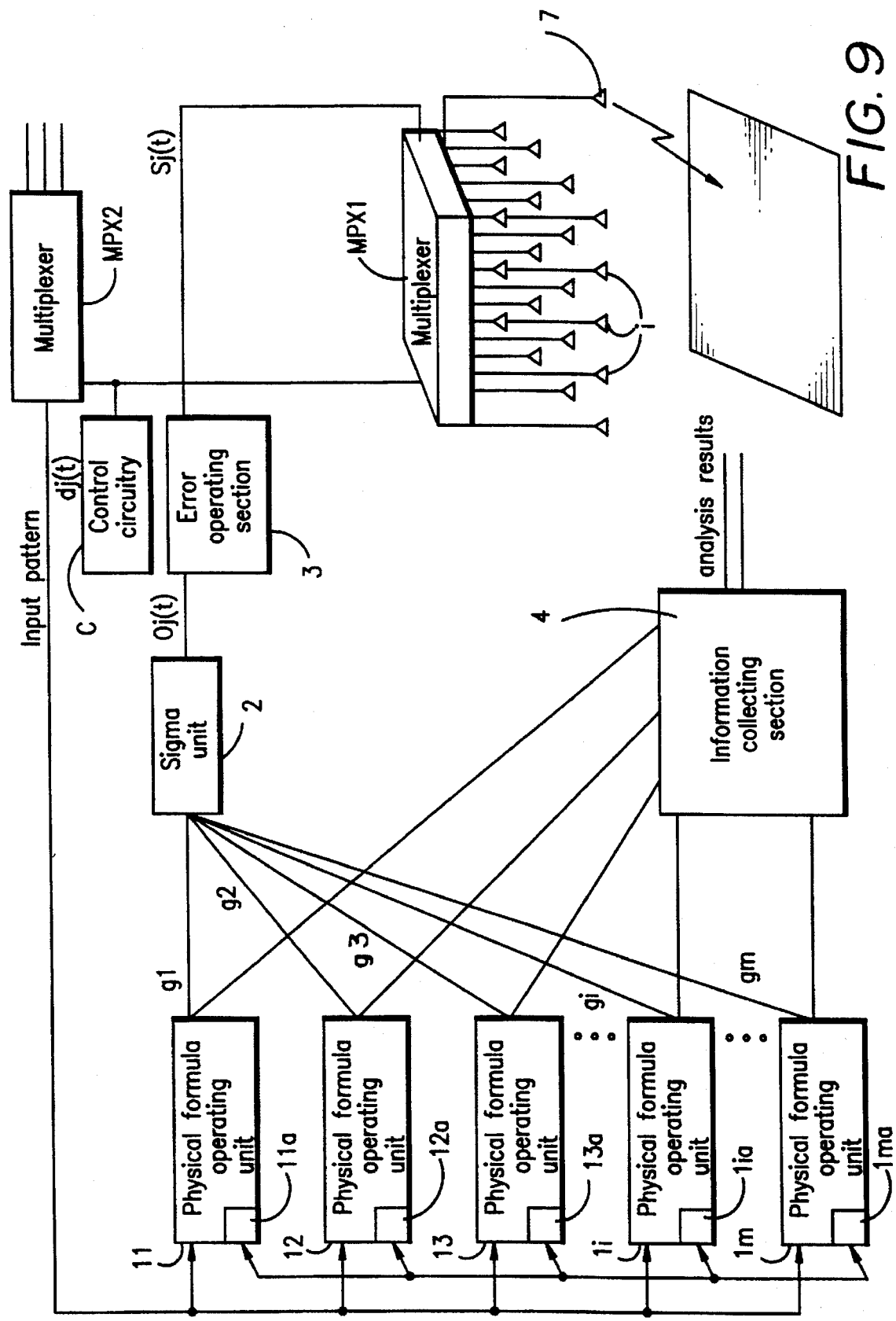
FIG. 9 is a schematic block diagram illustrating an arrangement of an echo searching apparatus using the apparatus illustrated in FIG. 1.

FIG. 9 is a schematic block diagram illustrating an arrangement of an echo searching apparatus using the apparatus in FIG. 1.

The apparatus differs from the apparatus of FIG. 1 in that a sound wave is radiated from one wave radiating device 7, m-numbered wave receiving sensors i for receiving reflected waves from n-numbered reflecting points are disposed so as to detect the reflected waves. One measured value among n-numbered measured values and its observation condition are selected by multiplexers MX1 and MX2, respectively, so as to supply the selected measured value and the observation condition to the error operating section 3 as teacher signals, the multiplexers MX1 and MX2 being controlled by a control circuitry C.

Figure 10:
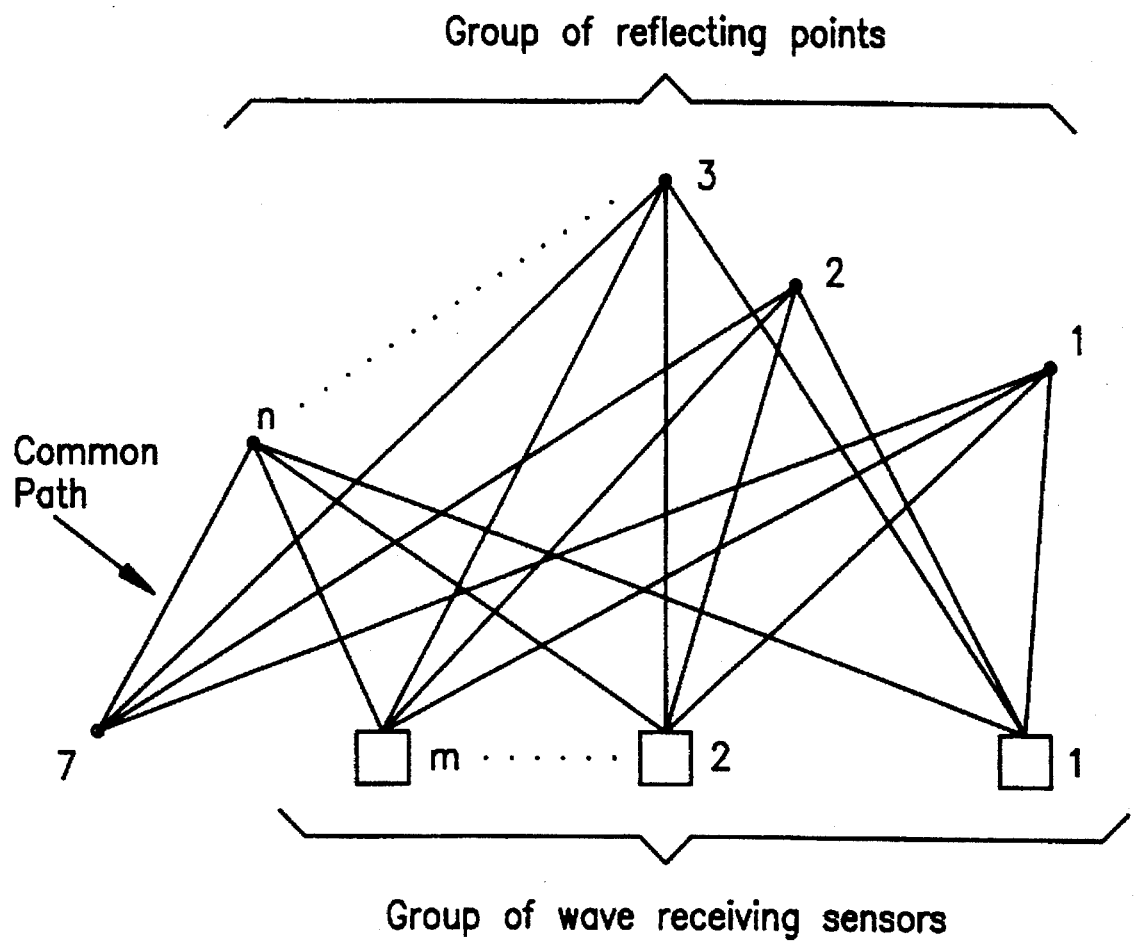
FIG. 10 is a diagram schematically illustrating relationships of a wave radiating point, reflecting points and wave receiving points.

When it is supposed that the wave radiating device 7 is an extremely small point sound source, and radiates a short pulse with a time waveform of S(t), and a velocity potential is expressed by φijk, the velocity potential being generated at time j by having the sound wave reflected by the reflecting points k (k=1, 2, . . . n) to the wave receiving sensors i (i=1, 2, . . . m), as is illustrated in FIG. 10, it is known that the velocity potential φij observed by the wave receiving sensor i at time j is determined by the following equation, when sound pressure is sufficiently small.

$$\phi ij = \sum_{K=1}^{n} \phi ijk$$

Passages of a sound wave which generates velocity potential at the wave receiving sensors i, are common from the wave radiating device 7 to the reflecting point k, and are different from the reflecting point k to each wave receiving sensor i from one another. When the distance from the wave radiating device 7 to the reflecting point k is indicated with rsk, and the distance from the reflecting point k to the wave receiving sensor i is indicated with rRki, the following equation can be obtained, because velocity potential is damped in reverse proportion to distance.

$$\phi ijk = \alpha k \cdot S\{t - (rsk + rRki)/c\} \cdot (1/rsk) \cdot (1/rRki)$$

In the equation, c indicates sound speed, and αk indicates a constant which corresponds to the reflecting rate at the reflecting point k. Conversion between time t and time j is supposed to be performed by $t = \Delta t \cdot j$ based upon a sampling interval $\Delta t$. Furthermore, when coordinates of the wave radiating device 7 are supposed to be (xs, ys, zs), coordinates of the reflecting point k are supposed to be (xk, yk, zk), and coordinates of the wave receiving sensor i are supposed to be (xi, yi, zi), for the purpose of uniting coordinates, the following equations are obtained.

$$rsk = \{(xs-xk)^2 + (ys-yk)^2 + (zs-zk)^2\}^{1/2}$$

$$rRki = \{(xi-xk)^2 + (yi-yk)^2 + (zi-zk)^2\}^{1/2}$$

φijk can be expressed with a function {φijk=φ(αk, xk, yk, zk)} which has four unknowns αk, xk, yk and zk. Therefore it is possible to apply this to the apparatus in FIG. 9. The input pattern becomes j, xi, yi, zi, and the teacher pattern becomes a measured value Φij of φij.

As is apparent from the foregoing, echo searching with high accuracy can be performed with a relatively small number of learning times, by determining studying rules of the unknowns in the physical formula operating units in FIG. 9, as the following equations.

$$\left.\begin{array}{ll}
\alpha k = \alpha k + \epsilon a & (\Phi ij - \phi ij)(\partial \phi ijk/\partial \alpha k) \\
xk = xk + \epsilon x & (\Phi ij - \phi ij)(\partial \phi ijk/\partial xk) \\
yk = yk + \epsilon y & (\Phi ij - \phi ij)(\partial \phi ijk/\partial yk) \\
zk = zk + \epsilon z & (\Phi ij - \phi ij)(\partial \phi ijk/\partial zk)
\end{array}\right\} \quad (19)$$

In these equations, εa, εx, εy, εz are learning gains and are positive constants.

Partial differential terms in the equations (19) can be calculated by performing formula deformation arithmetically, and also can be calculated based upon a numerical operation method. When the partial differential term is calculated based upon the numerical operation method, the partial differential term can easily be calculated by the following equation.

$$\partial \phi ijk/\partial \alpha k = \{\phi(\alpha k + \epsilon a, xk, zk) - \phi(\alpha k - \epsilon a, xk, yk\ zk)\}/2\epsilon a$$

The embodiment describes only a case in which the apparatus is applied to echo searching, but the apparatus can be applied in a similar manner for performing analysis (analysis for absorbance characteristic of infrared and the like) based upon physical quantities which are not radiated, from physical sources.

Fourth Embodiment

Figure 11:
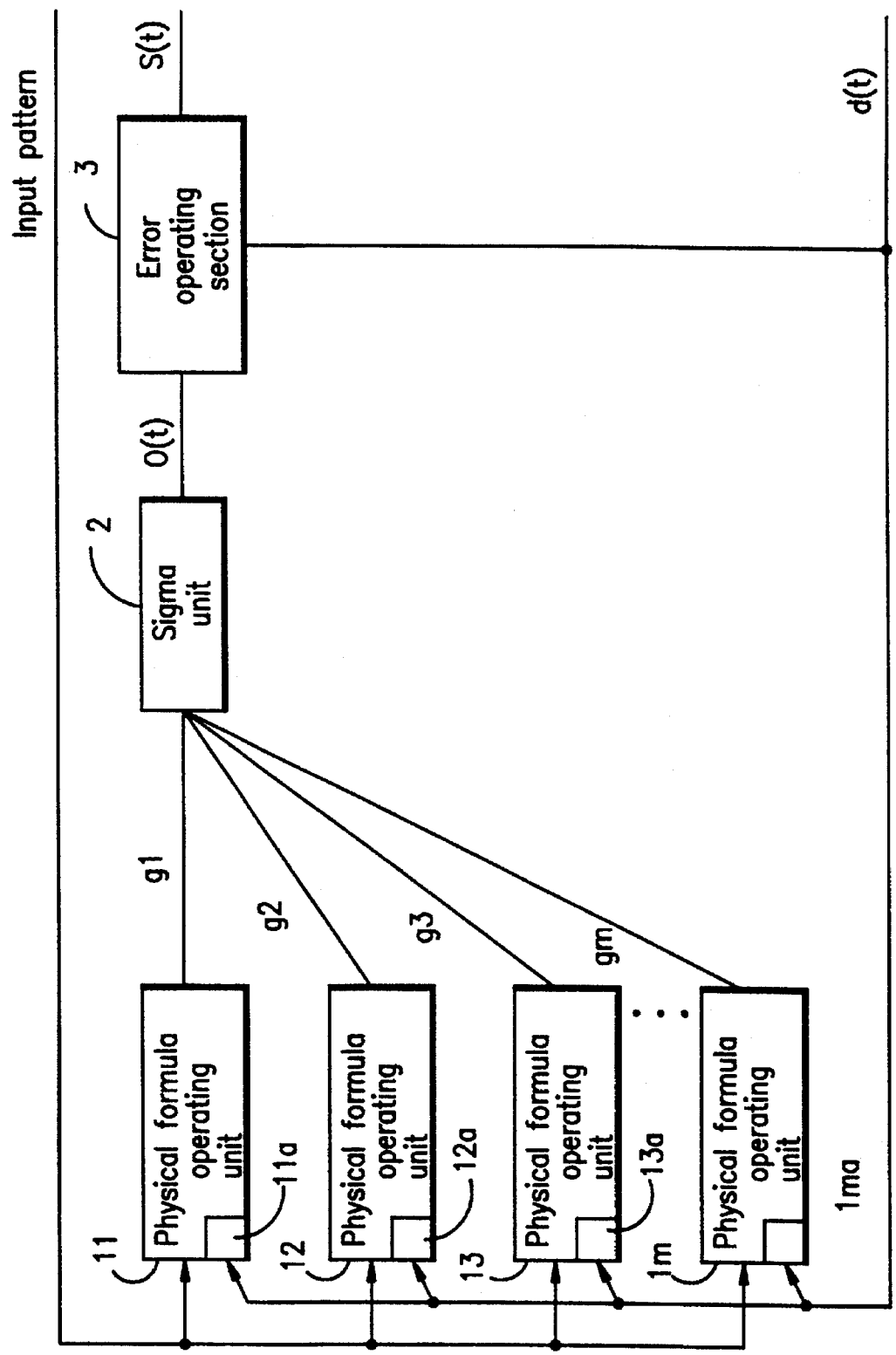
FIG. 11 is a block diagram illustrating an apparatus for reducing line spectrum noise.

FIG. 11 is a block diagram illustrating an apparatus for reducing line spectrum noise, i.e., for reducing only noises having line spectrum characteristics, from a signal objected to measurement, when a frequency band of the signal and a frequency band of the noises overlap each other. The apparatus differs from the apparatus of FIG. 1 in that the information collecting unit 4 is omitted.

Such noises having line spectrum characteristics are reduced by raising the analysis accuracy of data processing in a latter, stage. In convention, an analog filter or an adaptive filter is generally employed. A band elimination filter, one species of analog filters, is simplified in its arrangement and is cheap. However, the band elimination filter has disadvantages in that the filter attenuates not only line spectrum noise components of a noise source but also spectrum components of a signal objected to measurement, and in that the filter shifts not only amplitude but also phase in the neighboring area around a center frequency, and in that the filter inevitably lowers the analysis accuracy of the signal objected to measurement. When the adaptive filter is employed, only line spectrum noise components of a noise source can be reduced, and analysis accuracy of a signal objected to measurement can be raised. However, the adaptive filter has the disadvantage that the arrangement of the adaptive filter becomes complicated because a reference channel is necessary, the reference channel measuring only line spectrum noise components of a noise source. The adaptive filter cannot be applied to a case in which measuring only line spectrum noise components of a noise source is impossible.

The apparatus for reducing line spectrum noise illustrated in FIG. 11 distinguishes the above-mentioned disadvantages. The apparatus supplies operation results output from physical formula operating units 11, 12, ... 1n to the sigma unit 2, a number of physical formula operating units being equal to the number of line spectrum noises which should be reduced. The apparatus supplies the cumulatively added result O(t) output from the sigma unit 2, and the measured value S(t) of the physical quantity as the teacher pattern, to the error operating section 3 so as to calculate the difference d(t) between them. The apparatus feedbacks the calculated difference d(t) to the correcting sections 11a, 12a, ... 1ma of the physical formula operating units 11, 12, ... 1m, and outputs the difference d(t) as a signal which is used to reduce line spectrum noises therefrom. The number and frequency of line spectrum noises objected to reducing are previously measured. In the correcting sections 11a, 12a, ... 1ma, unknowns included in the physical formula are corrected so as to minimize the square value of the error d(t).

Operations of the apparatus for reducing line spectrum noise, having the arrangement mentioned above, are as follows.

When it is supposed that frequencies fi of line spectrum noises, which are causes of interference, are measured by a measuring means which is conventionally known, the corresponding line spectrum can be expressed by the following equation.

$$g(t, Ai, \theta i) = Ai \cdot \sin(2\pi fit + \theta i)$$

Therefore, the cumulatively added result O(t) can be expressed by the following equation.

$$O(t) = \sum_{i=1}^{m} Ai \cdot \sin(2\pi fit + \theta i)$$

The difference d(t) becomes d(t)=S(t)−O(t). And, the partial differential values of the cumulatively added result O(t) becomes the following equations.

$$\partial O(t)/\partial Ai = \sin(2\pi fit + \theta i)$$

$$\partial O(t)/\partial \theta i = Ai \cdot \cos(2\pi fit + \theta i)$$

From the foregoing equations, equations for correcting unknowns Ai and Θi become the following equations.

$$Ai = Ai + \epsilon A \cdot d(t) \cdot \sin(2\pi fit + \theta i)$$

$$\theta i = \theta i + \epsilon T \cdot d(t) \cdot Ai \cdot \cos(2\pi fit + \theta i)$$

In the equations, εA and εT are positive constants, respectively.

Therefore, the unknowns Ai and θi can be estimated with high accuracy by performing operations based upon the above-mentioned equations for correction based upon the difference d(t) in the correcting sections 11a, 12a, ... 1ma of the physical formula operating units 11, 12, ... 1m. When the unknowns Ai and i are accurately estimated, the corresponding line spectrum noises are output from the physical formula operating units 11, 12, ... 1m. The line spectrum noises are cumulatively added by the cumulative addition device 2, and are subtracted from the measured signal S(t) by the error operating section 3 after being cumulatively added by the cumulative addition device 2. Thereby, the difference d(t) is output which is obtained by reducing only line spectrum noises from the measured signal.

The following software program is a software program for estimating an amplitude Ai and a phase θi of one line spectrum noise.

```
FOR j = 0 TO 2000
    Sj = FNF (j, A0, f0, θ0)
    Oj = FNF (j, Ai, fi, θi)
    dj = Sj − Oj
    Ai = Ai + εA * dj * Oj/Aj
    IF Ai < 0 THEN Ai = −Ai: θi = θi + π
    θi = θi − INT (θi/2π) * 2π
    IF θi < 0 THEN θi = θi + 2π
    Oj = FNF (j, Ai, fi, θi)
    DO = FNG (j, Ai, fi, θi)
    dj = Sj − Oj
    θi = θi + εT * dj * DO
    θi = θi − INT (θi/2π) * 2π
    IF θi < 0 THEN θi = θi + 2π
NEXT j
```

In the software program, it is defined that

FNF(j, A, f, θ)=A*sin(2π*f*j/1000+θ)

FNG(j, A, f, θ)=A*cos(2π*f*j/1000+θ)

εA=0.003, εT=0.000003

Figure 12:
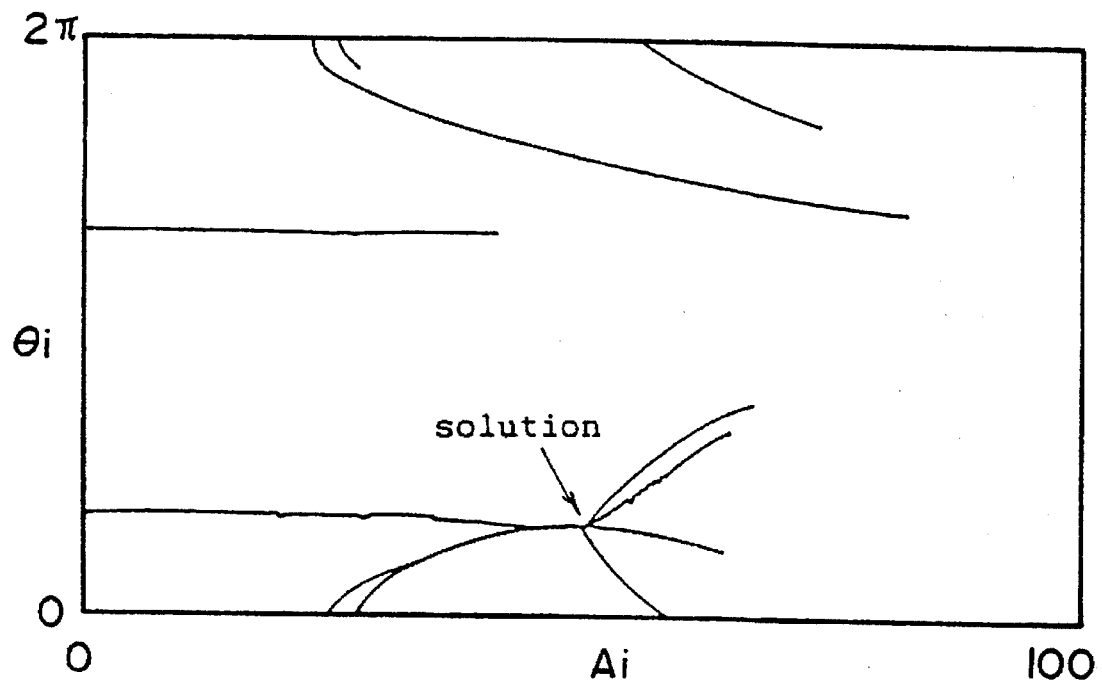
FIG. 12 is a diagram illustrating a converging condition of one line spectrum noise corresponding to variation of initial values.

In the above-mentioned software program, when the amplitude of the line spectrum is determined to be 48.0000, the phase of the line spectrum noise is determined to be 0.9767, and the frequency of the line spectrum noise is determined to be 90.000000, and simulations are carried out by giving various initial values, the same estimated values {the amplitude Ai is 48.0006 or 47.9994, the phase θi is 0.9767, the estimated error dj is +5E-4 degrees, the value of the estimated function Ej is 3E-7 degrees} as the determined values are obtained as is illustrated in FIG. 12, by repeating the processing by a total of 10,000 times. Ai seems to have two answers, but it is caused by the calculation being carried out with a 32 bit single precision floating point form so that accuracy of 5.5 digits degree at decimal number is obtained.

Figure 13:
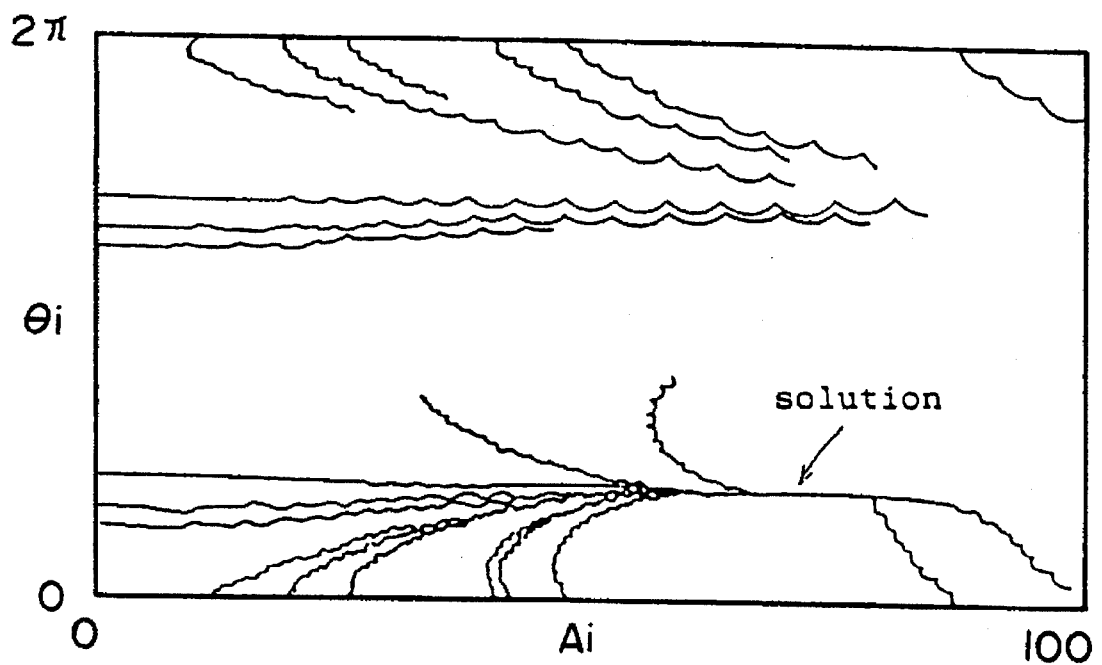
FIG. 13 is a diagram illustrating a converging condition of plural line spectrum noises.

When the amplitude of the line spectrum is determined to be 72.0000, the phase of the line spectrum noise is determined to be 1.3525, and the frequency of the line spectrum noise is determined to be 18.000000, and simulations are carried out by giving various initial values, the same estimated values {the amplitude Ai is 71.9987, the phase (θi is 1.3525, the estimated error dj is 1.2E-3 degrees, the value of the estimated function Ej is 1.53E-6 degrees} as the determined values are obtained as is illustrated in FIG. 13, by repeating the processing by a total of 10,000 times. That is, the accuracy of 5.5 digits degree at decimal number is obtained.

The following software program is a software program for estimating amplitudes Ai and phases θi of plural line spectrum noises.

```
FOR j = 0 TO 10000
    Sj = 0
    FOR k = 1 TO k1
        Sj = Sj + FNF (j, A0 (k), f0 (k), θ0 (k))
    NEXT k
    FOR k = 1 TO k1
        Oj = 0
        FOR kL = 1 TO k1
            Oj = Oj + FNF (j, Ai (kL), fi (kL), θi (kL))
        NEXT kL
        dj = Sj − Oj
        dA = FNFA (j, Ai (k), fi (k), θi (k))
        Ai (k) = Ai (k) + εA * dj * dA
        IF Ai (k) < 0 THEN Ai (k) = −Ai (k): θi (k) = θi (k) + π
        θi (k) = θi (k) − INT (θi (k)/2π) * 2π
        IF θi (k) < 0 THEN θi (k) = θi (k) + 2π
        Oj = 0
        FOR kL = 1 TO k1
            Oj = Oj + FNF (j, Ai (kL), fi (kL), θi (kL))
        NEXT kL
        dj = Sj − Oj
        dT = FNFT (j, Ai (k), fi (k), θi (k))
        θi (k) = θi (k) + εT * dj * dT
        θi (k) = θi (k) − INT (θi (k)/2π) * 2π
        IF θi (k) < 0 THEN θi (k) = θi (k) + 2π
    NEXT k
NEXT j
```

In the software program, it is defined that

FNF(j, A, f, θ)=A*sin(2π*f*j/1000+θ),

FNFA(j, A, f, θ)=sin (2π*f*j/1000+θ),

FNFT(j, A, f, θ)=A*cos(2π*f*j/1000+θ),

εA=0.005, εT=0.000005, k0, k1 and that k0 and k1 are unknown numbers.

Figure 14:
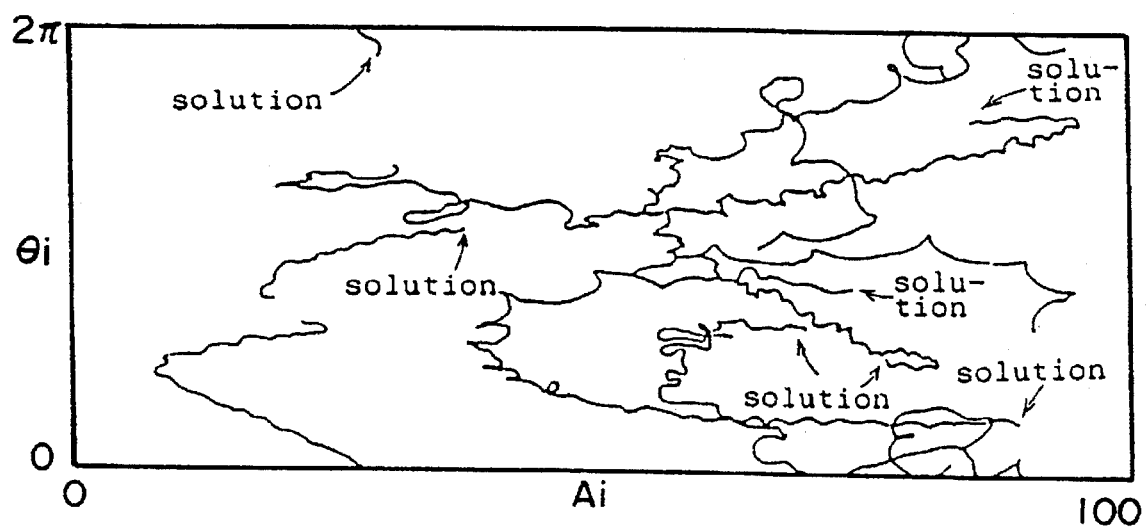
FIG. 14 is a diagram illustrating a converging condition of plural line spectrum noises.
Figure 15:
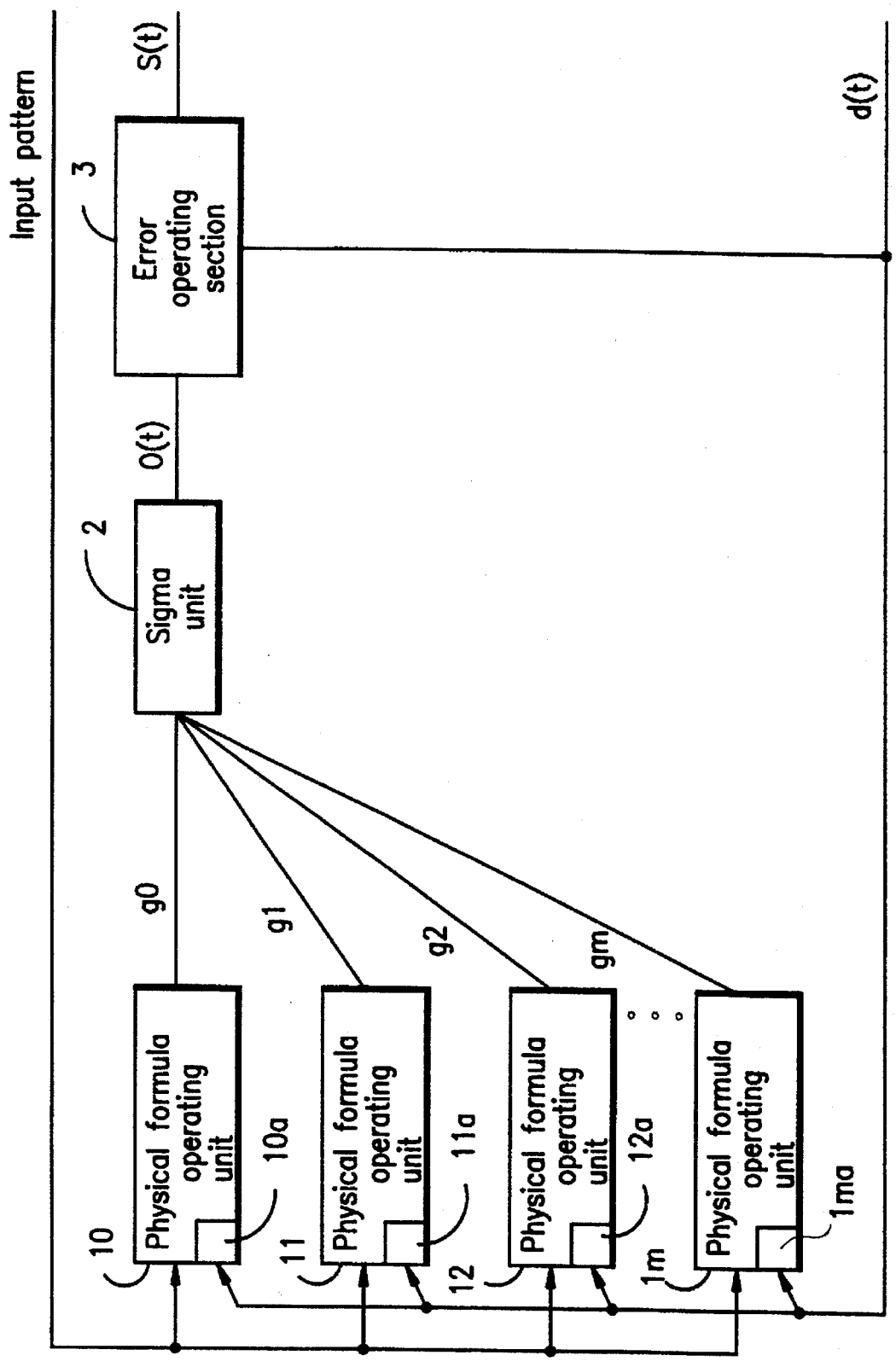
FIG. 15 is a block diagram illustrating an apparatus for reducing line spectrum noise which includes a direct current offset reducing function.

In the above-mentioned software program, when it is determined that k0=7, and k1=7, and amplitudes, phases and frequencies of 7 line spectrum noises are determined to be 69.0000, 2.1046, 34.000000; 75.0000, 2.6461, 29.000000; 86.0000, 5.0893, 45.0000; 29.0000, 5.9306, 67.000000; 90.0000, 0.8073, 20.000000; 37.0000, 3.4211, 90.000000; 77.0000, 1.6288, 46.000000, and simulations are carried out by giving various initial values, amplitudes and phases corresponding to each line spectrum are estimated as 69.0000, 2.1046; 75.0003, 2.6461; 85.9998, 5.0894; 29.0000, 5.9308; 90.0000, 0.8073; 36.9999, 3.4211; 77.0002, 1.6288. In these cases, the estimating processing number of times is 10,000, the estimated error dj is −4.8828E-4, and the estimated function Ej is 2.38419E-7. That is, each of the unknowns are estimated with an accuracy of 6 digits, which is the limit of a 32 bit single precision floating point form. The estimating processes of these 7 line spectrums are illustrated in FIG. 14.

In this embodiment, when the cumulatively added value O(t) is defined by the following equation, direct current offset can also be cancelled.

$$O(t) = A0 + \sum_{i=1}^{m} Ai \cdot \sin(2\pi fit + \theta i)$$

In this case, it is necessary that a physical formula operating unit 10 for performing the operation of $A0=A0+\epsilon A \cdot d(t)$ and for estimating unknowns is added.

Fifth Embodiment

Figure 16:
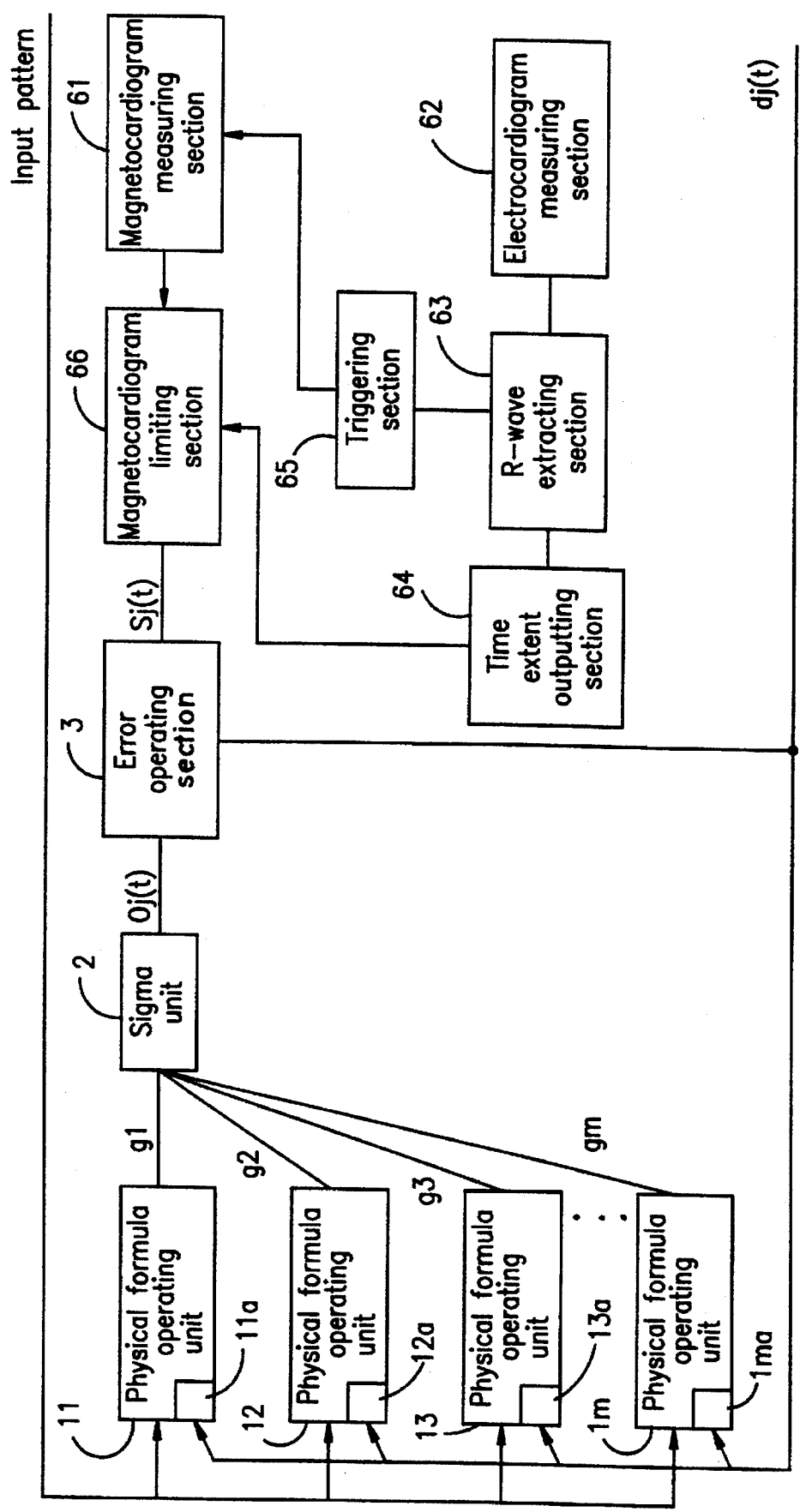
FIG. 16 is a block diagram illustrating a magnetocardiogram (MCG) measuring apparatus.

FIG. 16 is a block diagram illustrating a magnetocardiogram measuring apparatus.

The apparatus differs from the apparatus of FIG. 11 in that the apparatus of FIG. 16 further includes a magnetocardiogram measuring section 61, an electrocardiogram measuring section 62, an R-wave extracting section 63 for extracting an R-wave based upon the obtained electrocardiogram (hereinafter referred to as an ECG), a time extent outputting section 64 for obtaining time extents of a P-wave and T-wave which are prior and subsequent with respect to the extracted R-wave, a triggering section for triggering the obtained magnetocardiogram (hereinafter referred to as a MCG) corresponding to the R-wave of the ECG, and a magnetocardiogram limiting section 66 for inhibiting the MCG to be supplied to the error operating section 3, the inhibited MCG corresponding to the time extent of the P-wave and the T-wave.

Figure 17:
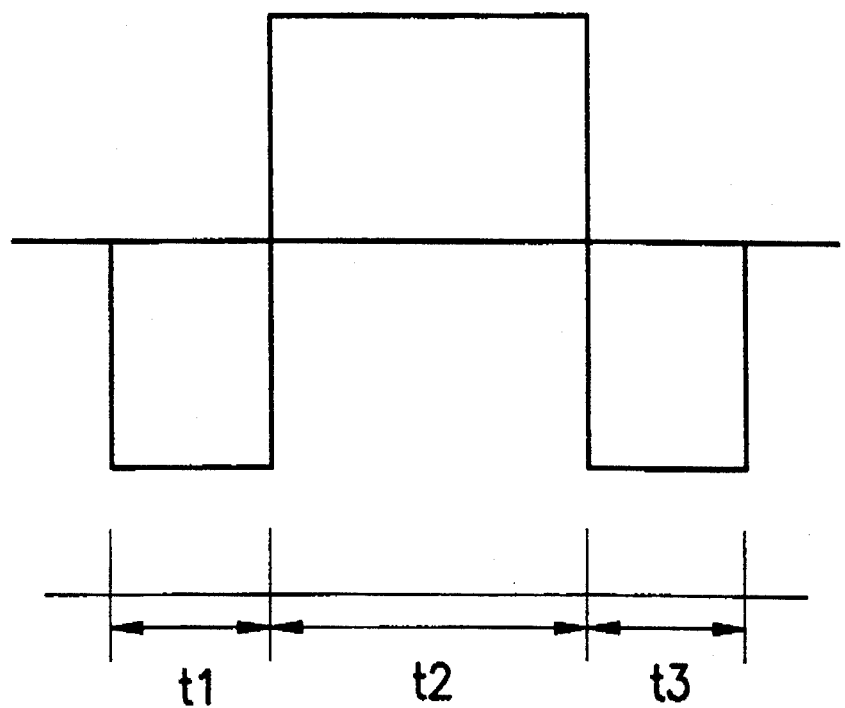
FIG. 17 is a diagram illustrating an example of a rectangular window for extracting a Q-R-S group of an ECG.

The R-wave extracting section 63 obtains cross correlations of a Q-R-S group using a rectangular window (refer to FIG. 17) which comprises a first negative wave, a positive wave and a second negative wave, which waves are determined at a predetermined time ratio (t1: t2: t3). It also determines a time corresponding to the maximum value of the cross correlations, as a center time of the Q-R-S group, that is a time of the R-wave, by paying attention to the fact that a shape of the Q-R-S group in the ECG is a negative-positive-negative pulse wave.

The magnetocardiogram measuring section 61, electrocardiogram measuring section 62, and triggering section 65 are omitted from the detailed description because conventionally known apparatus can be employed as the sections.

Operations of the magnetocardiogram measuring apparatus having the above-mentioned arrangement are as follows.

The inventor has continued studying magnetocardiograms earnestly, and has found that spectrums having the same frequencies as frequency components of line spectrums which are caused by a commercial power source, noises of a refrigerator and the like, appear at appearing time of the R-wave and T-wave of the ECG, and that the appeared spectrums act as disturbances to an estimating processing of line spectrum noises in a magnetocardiogram measurement. The inventor has also found that a required time period for the estimating processing is extremely lengthened because of the above-mentioned spectrums which appear at the appearing time of the R-wave and T-wave, when estimating processing of unknowns in each physical formula operating unit are performed by supplying the entirety of the magnetocardiogram to the error operating section 3 as a teacher signal.

The embodiment was made based upon the above-mentioned knowledge. The embodiment improves convergence by omitting samplings of magnetocardiogram corresponding to a region from the beginning of the P-wave to the end of the T-wave, and from estimating processing of unknowns, and extremely shortens the required time period for the estimating processing.

Figure 18A:
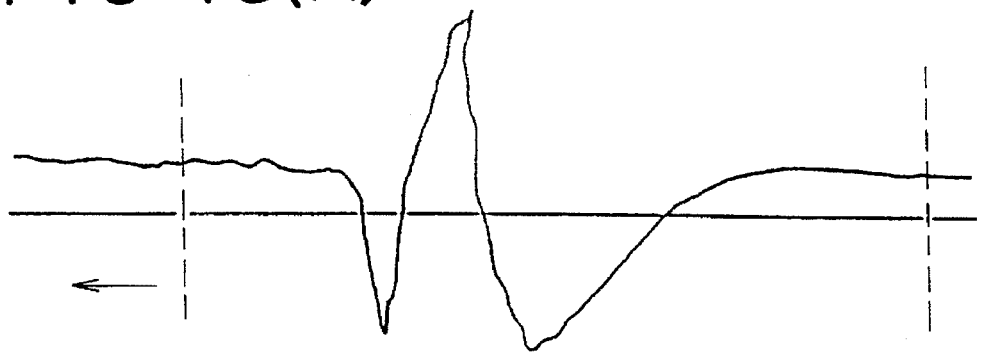
FIG. 18(A) is a diagram illustrating a waveform of an MCG.
Figure 18B:
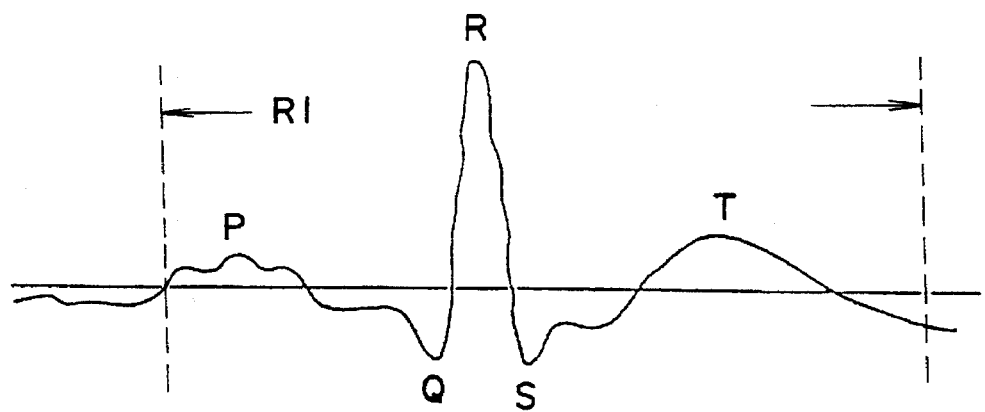
FIG. 18(B) is a diagram illustrating a waveform of an ECG.
Figure 18C:
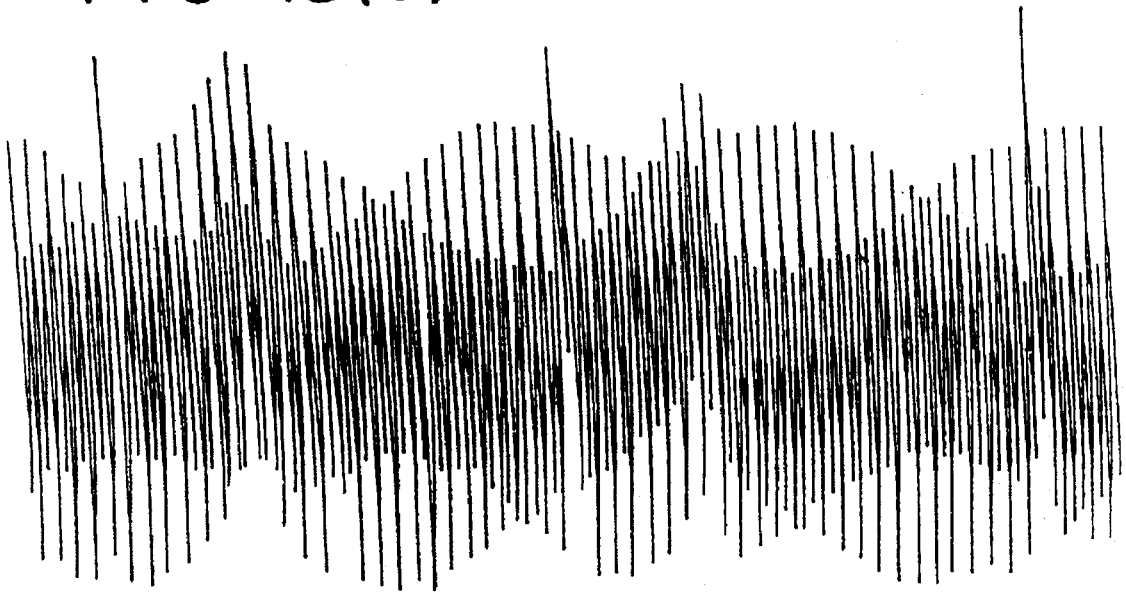
FIG. 18(C) is a diagram illustrating a waveform of a MCG in which spectrum noises are mixed.
Figure 19A:
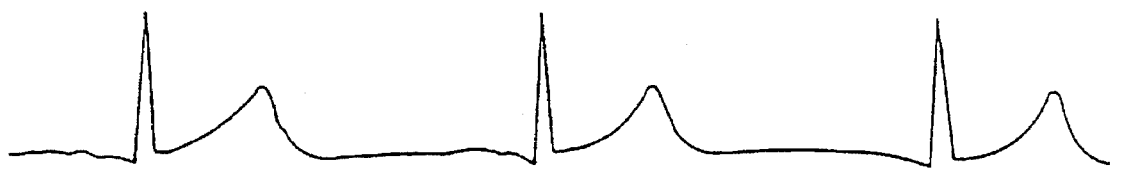
FIGS. 19(A) to (F) are diagrams illustrating MCG waveforms corresponding to an increase in the number studying times when a magnetocardiogram is measured using the entirety of the MCG as a teacher signal.
Figure 19B:
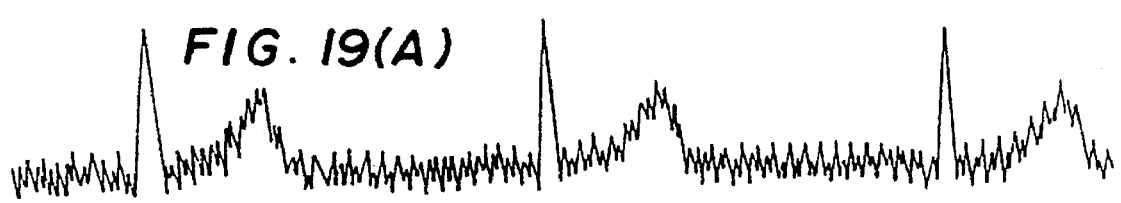
Figure 19C:
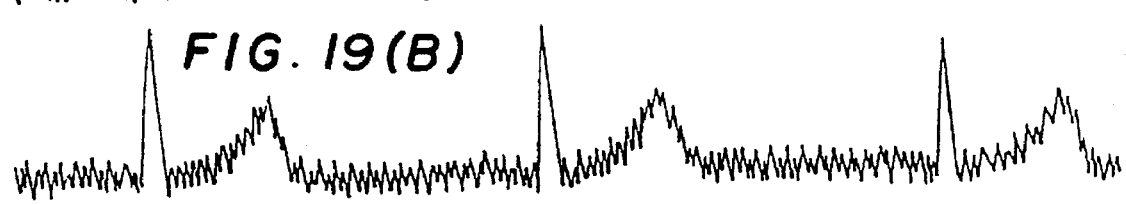
Figure 19D:
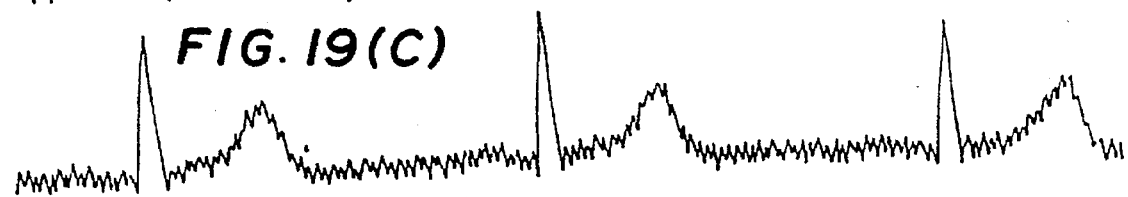
Figure 19E:
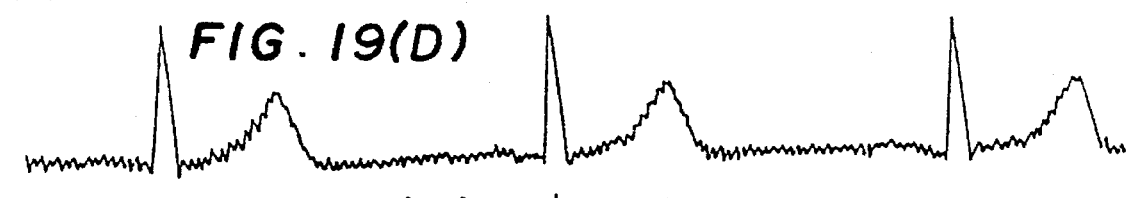
Figure 19F:
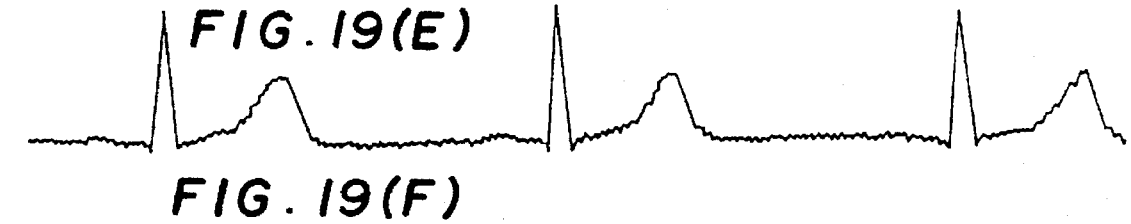
Figure 20A:
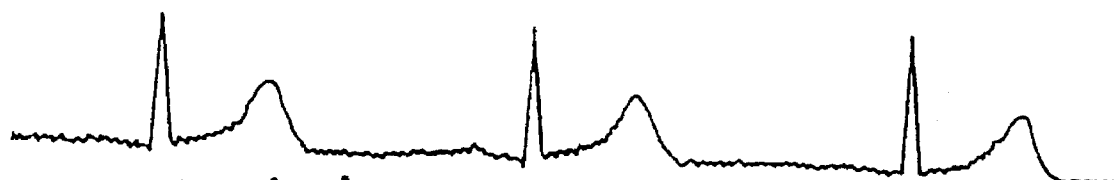
FIGS. 20(A) to (E) are diagrams illustrating MCG waveforms corresponding to an increase of a number of studying times when a magnetocardiogram is measured using the magnetocardiogram measuring apparatus illustrated in FIG. 10.
Figure 20B:
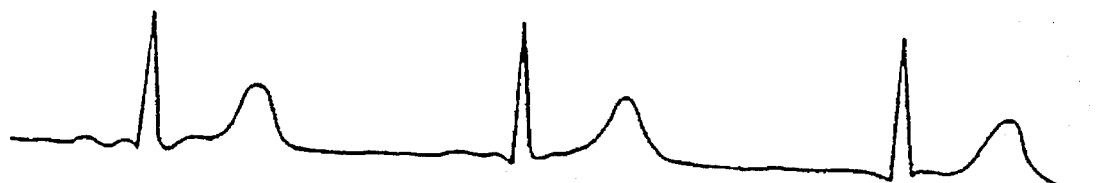
Figure 20C:
Figure 20D:
Figure 20E:

More particularly, a relationship between the MCG and the ECG in an ideal condition, in which no spectrums as disturbances are included, is illustrated in FIGS. 18 (A) and (B). And a waveform which is obtained by mixing spectrum noises of 29 Hz and 60 Hz to the MCG in an ideal condition is illustrated in FIG. 18 (C).

When unknowns are estimated by employing the entirety of the waveform of FIGS. 18 as teacher signals, using the line spectrum noise removing apparatus having the arrangement of FIG. 11, spectrum noises are greatly removed by carrying out the estimating processing by 1, 2, 3, 4 and 5 times based upon 2,500 samples of the teacher signal, which is illustrated in FIG. 19 (A) (refer to FIGS. 19 (B), (C), (D), (E) and (F)), and the MCG waveform (refer to FIG. 19 (F)) fairly similar to the waveform of FIG. 19 (A) is obtained. However, spectrum noises remain to some degree in the waveform of FIG. 19 (F), and become a cause for lowering the accuracy in data processing of subsequent stages. Therefore, a number of times of estimating processing should be increased when the spectrum noises are further decreased. As a result, the required time period is lengthened greatly.

On the contrary, when unknowns are estimated using the magnetocardiogram measuring apparatus having the arrangement of FIG. 16, a region (refer to the region R1 in FIG. 18 (B)) which includes from the P-wave to the T-wave of the ECG illustrated in FIG. 18 (B), is extracted by the R-wave extracting section 63, and a time extent from the beginning of the P-wave to the end of the T-wave is obtained by the time extent outputting section 64 based upon the peak time of the R-wave. And the MCG obtained by the magnetocardiogram measuring section 61 is triggered corresponding to the R-wave of the ECG by the triggering section 65, and the MCG corresponding to the time extent of P-wave and T-wave is inhibited by the magnetocardiogram limiting section 66 to be supplied to the error operating section 3.

When unknowns are estimated using the magnetocardiogram in the extent which is limited as such, as the teacher signal, spectrum noises are greatly removed by carrying out the estimating processing by 1, 2, 3, 4 and 5 times based upon 2,500 samples within the limited extent (refer to FIGS. 20 (A), (B), (C), (D) and (E)), and the MCG waveform (refer to FIG. 20 (E)) fairly similar to the waveform of FIG. 19 (A) is obtained. When the waveforms in FIGS. 19 and the waveforms in FIGS. 20 are compared, it is understood that the waveform in FIG. 20 (A) is similar to an intermediate waveform (a result of estimating processing by 4.5 times) between the waveform in FIG. 19 (E) and the waveform in FIG. 19 (F). As is apparent from the result, a required time period for estimating processing can extremely be shortened because the number of times of estimating processing can extremely be decreased, when spectrum noise is removed on a similar degree as the spectrum noise removal by the line spectrum noise removing apparatus having the arrangement of FIG. 11. When the estimating processing are carried out for a number of times which is the same as the line spectrum noise removing apparatus having the arrangement of FIG. 11, spectrum noise removing efficiency can be raised, and accuracy in data processing in subsequent stages can be raised.

Furthermore, operability can be raised, because the operation for preparing a template by collecting only spectrum noises becomes unnecessary.

Sixth Embodiment

Figure 21:
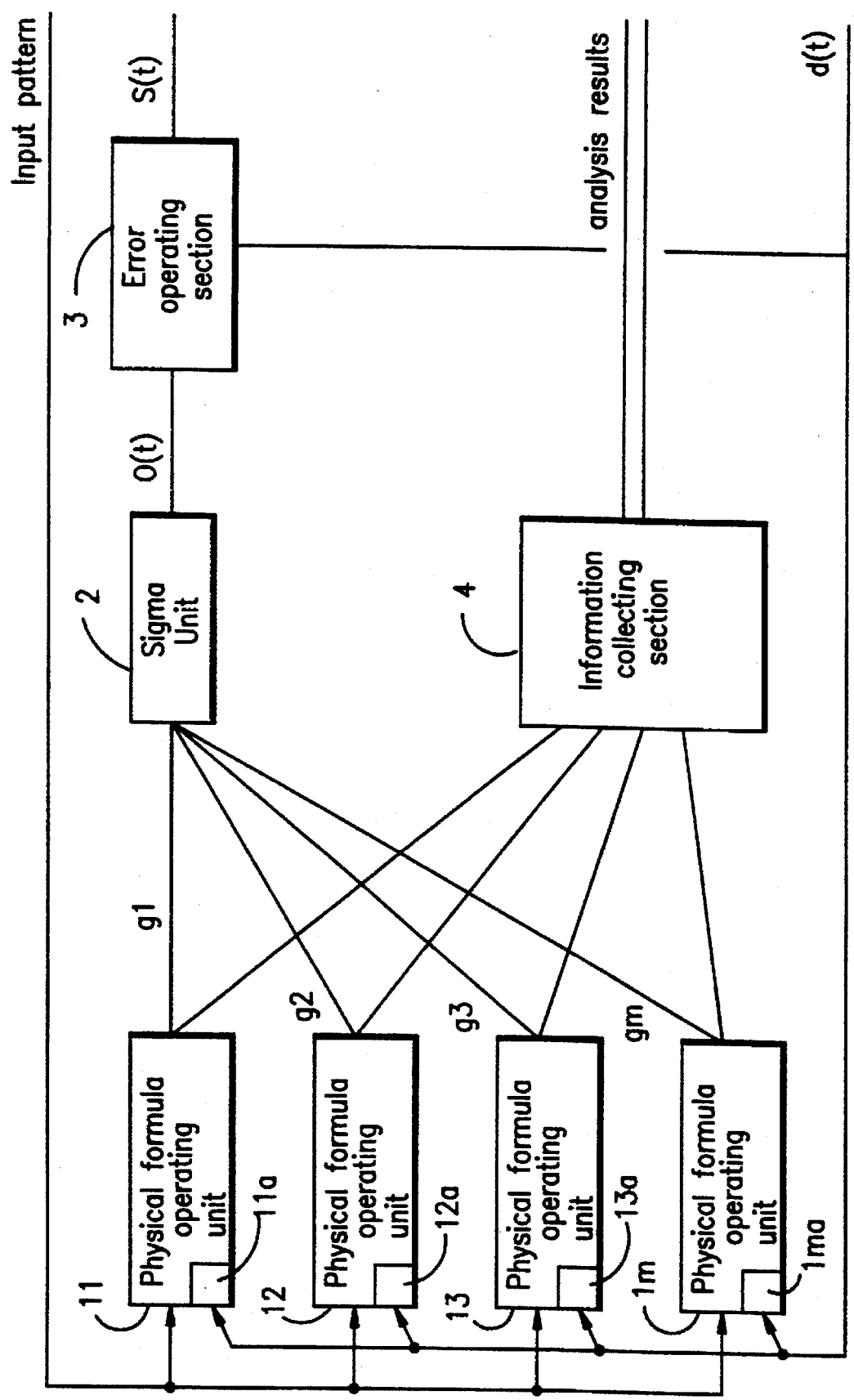
FIG. 21 is a block diagram illustrating an arrangement of a spectrum analyzer which analyzes components of desired frequencies.
Figure 22A:
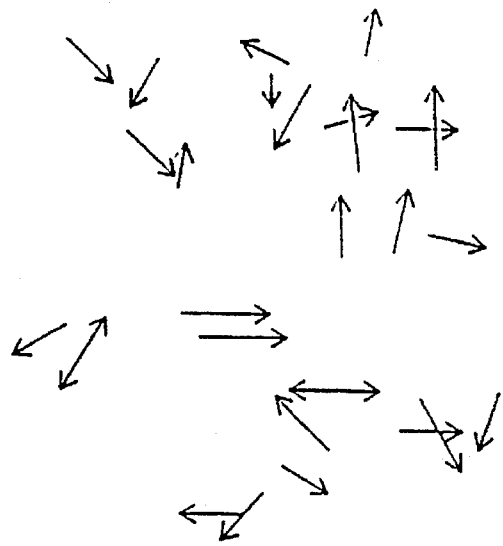
FIGS. 22(A), (B) and (C) are diagrams illustrating a magnetic source analysis result obtained by a conventional method.
Figure 22B:
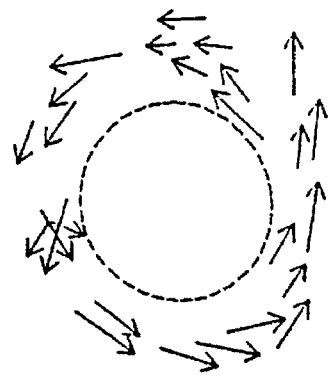
Figure 22C:
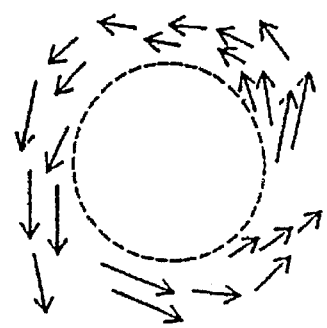
Figure 25:
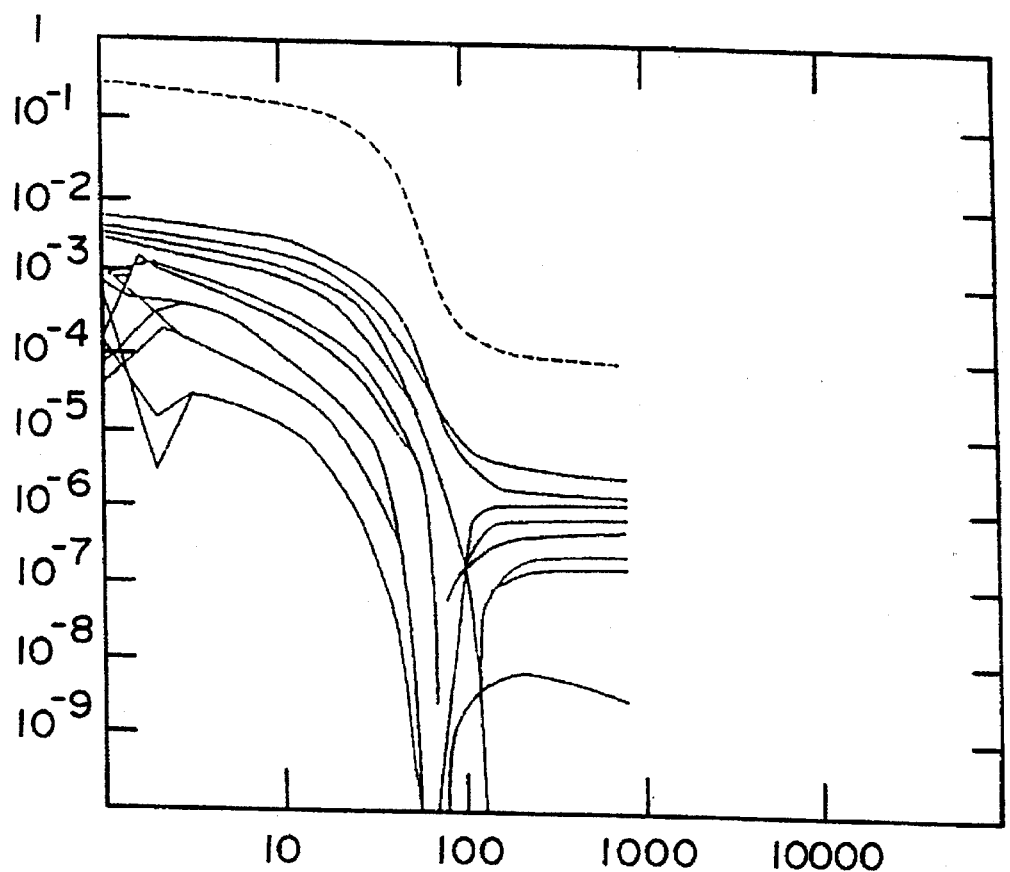
FIG. 25 is a diagram illustrating varying of an error as a whole and varying errors corresponding to an individual pattern which corresponds to a number of times of learning of the hierarchical perceptron.
Figure 26:
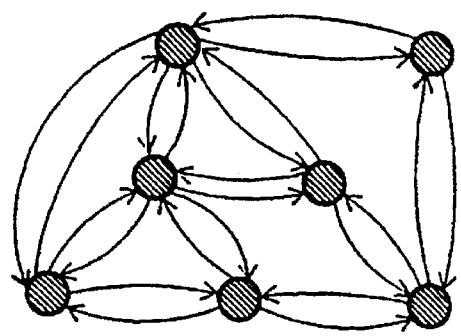
FIG. 26 is a diagram schematically illustrating a Hopfield model.

FIG. 21 is a block diagram illustrating an arrangement of a spectrum analyzer which analyzes components of desired frequencies.

The analyzer supplies operated on results output from physical formula operating units 11, 12, ... 1m, to a sigma unit 2 so as to operate cumulative addition, number of the physical formula operating units corresponding to a number of frequencies objected to analysis, supplies the cumulatively added result O(t) and a measured data S(t) objected to analysis to an error operating section 3 so as to calculate an estimated error d(t) and feeds back the estimated error d(t) as information for correction of unknowns to correcting sections 11a, 12a, ... 1ma of the physical formula operating units 11, 12, ... 1m. When the estimating processing for unknowns converges, converged unknowns are extracted from the physical formula operating units 11, 12, ... 1m, and are output as a frequency component analysis result by an information collecting unit 4. In the correcting sections 11a, 12a, ... 1ma, unknowns included in physical formulae are corrected so as to minimize a square value of the error d(t), for example.

From past years, fast Fourier transformation (hereinafter referred to as FFT) is known as a method which can analyze frequency components with high accuracy. However, the FFT has disadvantages that a low pass filter, called an antialiasing filter, does not have. A low pass filter is necessarily provided for removing unnecessary higher harmonics which are usually included in a measurement signal, and an arrangement of a FFT is complicated, because the FFT is a method for performing processing based upon a sampling theorem. The FFT has another disadvantage, which is that species of applicable signals are limited, because accuracy of frequency analysis result is extremely lower when it is not assured that data continue periodically within a sampling interval. To address these disadvantages, it is proposed to use a window function such as hamming, hanning and the like. A new disadvantage arises in that the waveform is distorted after the reverse filtering operation for the entirety of the sampling interval, when the window function is used in the reverse filter operation, and analysis accuracy is lowered. A disadvantage also arises in that a sampling number should inevitably be increased when analysis for a wide band is required, because only outputs at frequency intervals are obtained, which are determined based upon sampling intervals. Disadvantages further arise in that an extremely large amount of memory is needed because sampling must be performed at regular intervals even when an axis indicating frequency is expressed by a logarithmic scale, and that a sampling number is constrained to $2^N$.

This embodiment was made to dissolve these disadvantages. The embodiment makes the antialiasing filter unnecessary, and can use sampling data at irregular intervals, and can determine analyzing frequencies arbitrarily. More particularly, the following equation can be used as a model of a component having frequency fi in a signal objected to analysis.

$$O(t) = C + \sum_{i=1}^{m} \{Ai \cdot \cos(2\pi fit) + Bi \cdot \sin(2\pi fit)\}$$

In the equation, Ai and Bi are constants indicating amplitudes, respectively.

Relationships of the following equations are obtained from the above-mentioned equation.

$$\left.\begin{array}{l}\partial O(t)/\partial C = 1 \\ \partial O(t)/\partial Ai = \cos(2\pi fit) \\ \partial O(t)/\partial Bi = \sin(2\pi fit)\end{array}\right\} \quad (20)$$

The following equations are obtained by substituting these equations (20) for the equation (5).

$$O(t) = C + \sum_{i=1}^{m} \{Ai \cdot \cos(2\pi fit) + Bi \cdot \sin(2\pi fit)\}$$

$$d(t) = S(t) - O(t)$$

$$Ai = Ai + \epsilon A \cdot d(t) \cdot \cos(2\pi fit)$$

$$Bi = Bi + \epsilon B \cdot d(t) \cdot \sin(2\pi fit)$$

$$C = C + \epsilon C \cdot d(t)$$

Therefore, the operation of O(t) is carried out in the sigma unit 2, the operation for calculating the estimated error d(t) in the error operating section 3 is carried out, the operations for correcting the unknowns Ai, Bi, and C are carried out based upon the estimated error d(t) and the operations of physical formulae are carried out based upon the corrected unknowns in each physical operating unit. When the estimation of the unknowns Ai, Bi, and C is converged, each converged unknown is collected by the information collecting unit 4, thereby analysis of a component of arbitrary frequency included in a signal objected to analysis can be performed with high accuracy.

Possibility of Industrial Utilization

As is apparent from the foregoing, the methods and apparatus for analyzing physical source according to the present invention can calculate the physical quantity of a physical source with high accuracy and in an extremely short time period, in comparison with conventional analyzing apparatuses which use a supercomputer and the like, based upon measured values of the physical quantity, which values being obtained at plural points apart from the physical source such as a magnetic field source in the interior of a living body and others, and observation condition at the measuring timing. The methods and apparatus can preferably be applied to an apparatus for measuring biological magnetic field sources, and an apparatus for reducing line spectrum noise.

What is claimed:

1. A method for analyzing physical quantities measured at predetermined points apart from physical sources, when the physical quantities can be calculated based upon predetermined physical formulae which include variables corresponding to physical characteristics and which satisfies linear addition, the method comprising:

a) operating the physical formulae based upon known information, the physical formulae being determined corresponding to the nature of he physical quantities to be analyzed;

b) measuring a physical quantity to be analyzed;

c) calculating a difference between the measured physical quantity and a sum obtained by cumulatively adding the operation results of the physical formulae, d) correcting plural variables of the physical formulae based upon the calculated difference; and outputting the corrected variables included in each physical formula as analysis results of the physical quantities, after repeating steps a through d until the difference has become smaller than a predetermined value.

2. An apparatus for analyzing physical quantities measured at predetermined points apart from physical sources, when the physical quantities can be calculated based upon predetermined physical formulae which include variables corresponding to physical characteristics, and which satisfies linear addition, the apparatus comprising:

physical formula operating means for operating the physical formulae, a number of physical formula operating means being larger than a number of variables corresponding to physical characteristics of the physical quantity to be analyzed;

cumulative addition means for cumulatively adding operation results output from each physical formula operating means to produce a cumulatively added result output;

measuring means for measuring the physical quantity to be analyzed;

difference calculating means for receiving the cumulatively added result output from the cumulative addition means and a measured value of the physical quantity to be analyzed, and for calculating a difference between the cumulatively added result output and the measured value;

correcting means for correcting the variables in each physical formula based upon the calculated difference; and corrected result collecting means for collecting variables corrected by the correcting means, and for outputting the collected results as analysis results of physical quantities of physical sources.

3. An apparatus for analyzing physical quantities as set forth in claim 2, wherein the variables correspond to a quantity of fluorescently labeled material which is constrained to a wall of a light guide by an antigen-antibody reaction, and include an immunity fluorescence and nonspecific adsorption fluorescence, the predetermined physical formulae are each an experimental formula corresponding to an intensity of fluorescent light output from the light guide in response to the quantity of fluorescently labeled material constrained to the wall of the light guide, the number of physical formula operating means is a number which is not less than a number of variables included in the experimental formula, and the corrected result collecting means outputs the corrected variables as immunity measured results.

4. An apparatus for analyzing physical quantities as set forth in claim 2, wherein the variables correspond to a quantity of material which is generated or consumed under the existence of an enzyme, and include a density of material which performs reaction under the existence of the enzyme;

the predetermined physical formulae are a formula corresponding to a strength of an electric signal output from a base electrode which supports an enzyme-immobilized membrane after a test solution has been directly or indirectly deposited on the enzyme-immobilized membrane;

the number of physical formula operating means is a number which is not less than a number of variables included in the formula; and the corrected result collecting means outputs the corrected variables as density measured results.

* * * * *